United States Patent
Doan et al.

(10) Patent No.: US 10,338,765 B2
(45) Date of Patent: Jul. 2, 2019

(54) COMBINED SWITCHING AND WINDOW PLACEMENT

(71) Applicant: MICROSOFT CORPORATION, Redmond, WA (US)

(72) Inventors: Christopher Doan, Seattle, WA (US); Matthew Isaac Worley, Bellevue, WA (US); Miron Vranjes, Seattle, WA (US); Steven James Frederickson, Seattle, WA (US); Nils Anders Sundelin, Duvall, WA (US); Oliver Ross Prosser Jones, Seattle, WA (US); Richard Fang, Bellevue, WA (US); Richard Zarick, Seattle, WA (US); Jeremy Monroe Bowen, Renton, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 470 days.

(21) Appl. No.: 14/478,386

(22) Filed: Sep. 5, 2014

(65) Prior Publication Data

US 2016/0070423 A1 Mar. 10, 2016

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/1423* (2013.01); *G06F 9/4443* (2013.01);
(Continued)

(58) Field of Classification Search
CPC .... G06F 3/0481; G06F 3/1423; G06F 9/4443; G06F 5/14
See application file for complete search history.

(56) References Cited

U.S. PATENT DOCUMENTS

| | | | | |
|---|---|---|---|---|
| 5,305,435 A | * | 4/1994 | Bronson | G06F 3/0481 715/775 |
| 5,390,295 A | * | 2/1995 | Bates | G06F 3/0481 714/E11.188 |

(Continued)

FOREIGN PATENT DOCUMENTS

| | | |
|---|---|---|
| CN | 1525361 A | 9/2004 |
| CN | 1826575 A | 8/2006 |

(Continued)

OTHER PUBLICATIONS

Hollister, Sean, "Windows 8 Primer: How to Navigate Microsoft's New Operating System", Published on: Oct. 28, 2012 Available at: http://www.theverge.com/2012/10/28/3562172/windows-8-gestures-keyboard-shortcuts-tips-tricks-how-to-guide.

(Continued)

*Primary Examiner* — Nicholas Augustine
(74) *Attorney, Agent, or Firm* — Shook, Hardy & Bacon, L.L.P.

(57) ABSTRACT

Systems, methods, computer storage media, and graphical user interfaces (GUIs) are provided for combined switching and placement of windows based on a single action. The single action may be moving an element to a hot spot or a snap portion of a display area. In response to the single action, an element is automatically launched, repositioned according to a snap portion or a hot spot that recognized the element, and opened, and a view is automatically switched to a view of at least the element.

13 Claims, 23 Drawing Sheets

(51) Int. Cl.
*G06F 9/451* (2018.01)
*G06F 3/14* (2006.01)
*G06F 9/44* (2018.01)
*G09G 5/14* (2006.01)
*G06F 3/01* (2006.01)

(52) U.S. Cl.
CPC .............. *G06F 9/451* (2018.02); *G09G 5/14* (2013.01); *G09G 2354/00* (2013.01)

(56) References Cited

U.S. PATENT DOCUMENTS

| | | | | |
|---|---|---|---|---|
| 5,712,995 | A * | 1/1998 | Cohn | G06F 3/0481 715/792 |
| 5,796,402 | A * | 8/1998 | Ellison-Taylor | G09G 5/14 715/792 |
| 5,838,318 | A * | 11/1998 | Porter | G06F 3/0481 715/790 |
| 6,008,809 | A * | 12/1999 | Brooks | G06F 3/0481 715/792 |
| 6,075,531 | A * | 6/2000 | DeStefano | G06F 3/0481 715/788 |
| 6,832,355 | B1 * | 12/2004 | Duperrouzel | G06F 17/30905 707/E17.121 |
| 8,769,431 | B1 * | 7/2014 | Prasad | G06F 3/048 715/764 |
| 2003/0197739 | A1 | 10/2003 | Bauer | |
| 2007/0022389 | A1 * | 1/2007 | Ording | G06F 3/0481 715/790 |
| 2010/0066698 | A1 | 3/2010 | Seo | |
| 2011/0113354 | A1 | 5/2011 | Thiyagarajan et al. | |
| 2012/0081270 | A1 | 4/2012 | Gimpl et al. | |
| 2012/0176322 | A1 | 7/2012 | Karmi et al. | |
| 2013/0300684 | A1 | 11/2013 | Kim et al. | |
| 2013/0305184 | A1 | 11/2013 | Kim et al. | |
| 2013/0332881 | A1 | 12/2013 | Yook et al. | |
| 2014/0089833 | A1 | 3/2014 | Hwang et al. | |
| 2014/0143708 | A1 | 5/2014 | Yang et al. | |
| 2014/0164989 | A1 | 6/2014 | Kuhne | |

FOREIGN PATENT DOCUMENTS

| | | |
|---|---|---|
| CN | 101681247 A | 3/2010 |
| CN | 103412871 A | 11/2013 |
| CN | 103543904 A | 1/2014 |
| CN | 103631475 A | 3/2014 |
| EP | 2763131 A1 | 8/2014 |
| WO | 2014051920 A1 | 4/2014 |
| WO | 2014189612 A1 | 11/2014 |

OTHER PUBLICATIONS

"Split the Windows® Desktop: How to Divide a Single Large Desktop into Multiple Smaller Ones", Published on: Apr. 10, 2014 Available at: http://www.actualtools.com/multiplemonitors/split-windows-desktop-how-to-divide-single-large-desktop-into-smaller-ones.shtml.

Kishore, Aseem, "Split or Divide Your Desktop Screen into Multiple Parts", Published on: Oct. 18, 2008 Available at: http://www.online-tech-tips.com/free-software-downloads/split-or-divide-your-desktop-screen-into-multiple-parts/.

"Second Written Opinion Issued in PCT Application No. PCT/US2015/048224", dated Jul. 25, 2016, 9 Pages.

"International Search Report and Written Opinion Issued in PCT Application No. PCT/US2015/048224", dated Nov. 9, 2015, 15 Pages.

"International Preliminary Report on Patentability Issued in PCT Application No. PCT/US2015/048224", dated Nov. 22, 2016, 12 Pages.

"First Office Action and Search Report Issued in Chinese Patent Application No. 201580047587.4", dated Mar. 4, 2019, 10 Pages.

* cited by examiner

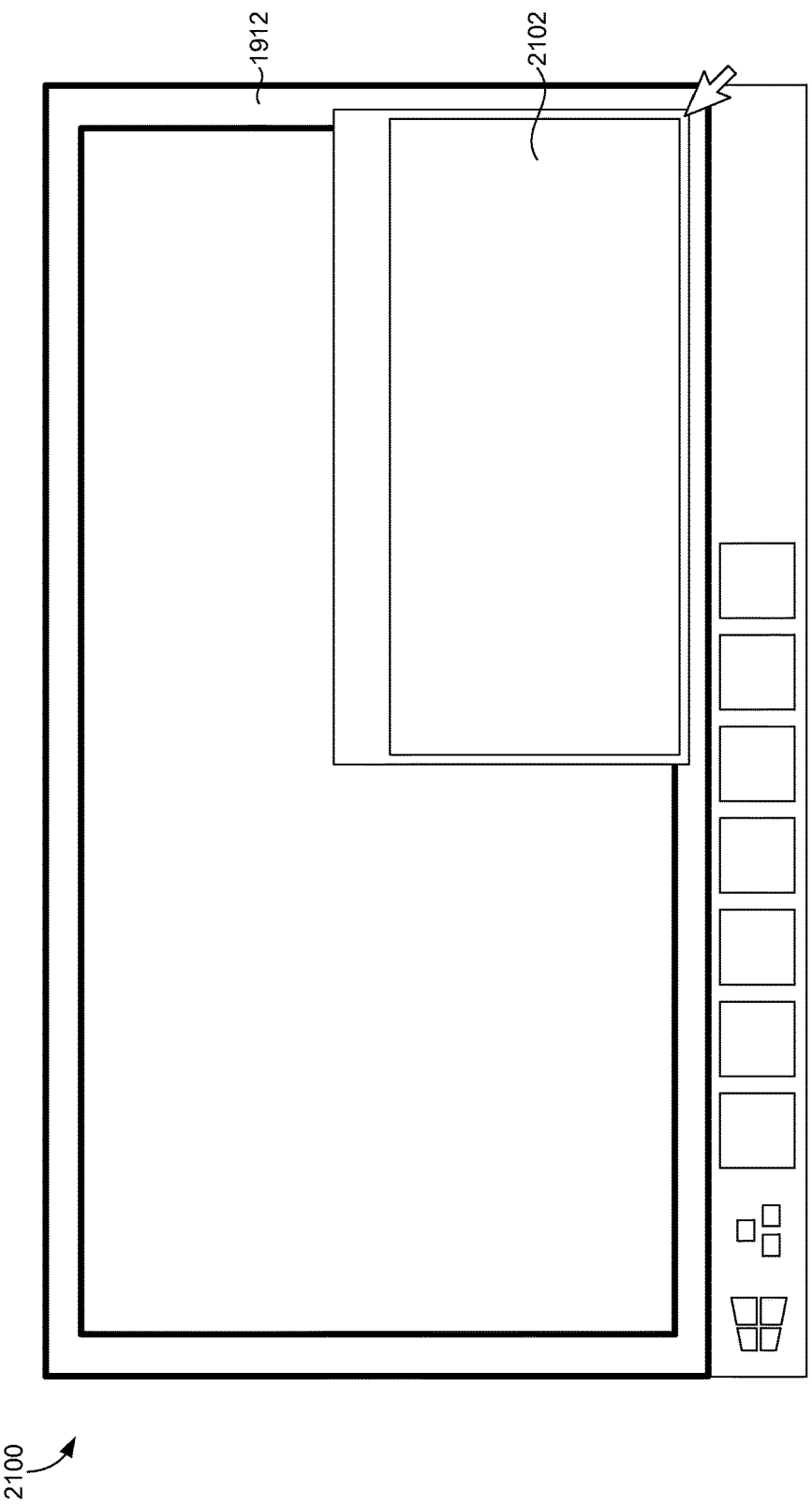

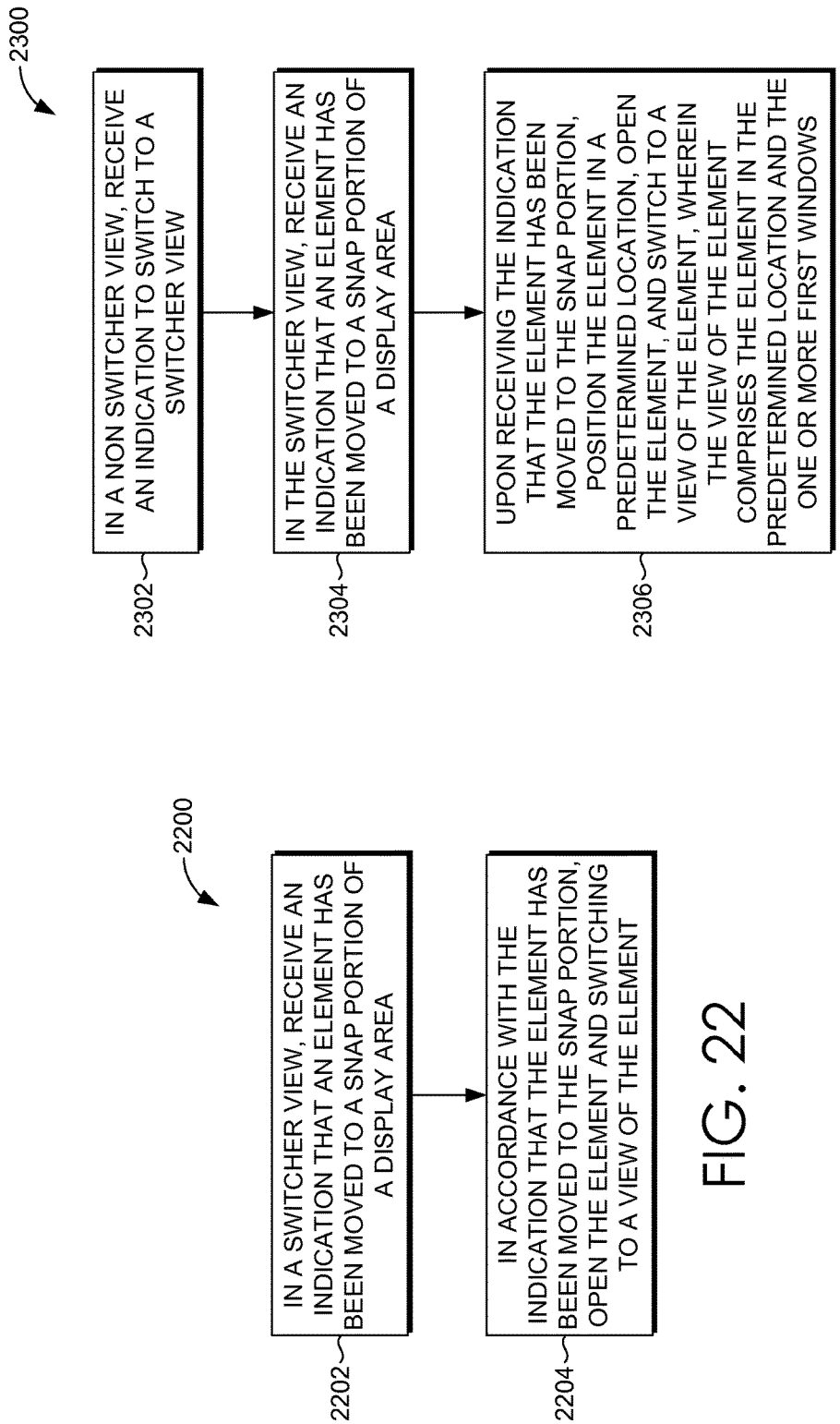

US 10,338,765 B2

COMBINED SWITCHING AND WINDOW PLACEMENT

BACKGROUND

Operating systems provide multiple utilities that assist in various functions including managing display areas of a displaying component (e.g., computer monitor, screen of a mobile device, and the like). Many operating systems provide a switcher to facilitate switching from one window to another window. In particular, a switcher presents representations of various windows (e.g., active windows) such that a user can simultaneously view multiple windows and easily select a window to which to switch.

In a typical user experience, users are frequently opening and closing windows and switching between multiple windows. This action, opening and positioning windows and switching between windows, requires multiple actions including locating the window the user wants to open, selecting the window desired, positioning the new window where the user wants it, switching to a view of the new window, etc. Such a multi-step operation is inefficient and likely decreases user satisfaction for an experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide methods, systems, computer storage media, and interactive graphic user interfaces (GUIs) for, among other things, combining switching and window placement in a single step operation. This may be done to increase efficiency and improve a user experience by eliminating various steps associated with switching between and placement of windows.

When a user wishes to switch to a view of a new window (e.g., a window that is not yet open, a window that is open but not visible, etc.) from, for example, one or more current windows, a single step may be taken to automatically initiate (1) launching the selected new window, (2) positioning the selected new window, and (3) switching to a view of the selected new window from a previous view. The previous view may have included the one or more current windows. The single step may be any step configured in an operating system to be recognized as the single step. In embodiments, the single step is a movement of an element (e.g., the desired new window) into a snap portion of a display. The snap portion of the display may be any region of a display area configured to identify said single step and initiate the appropriate responses. By combining multiple steps into one, user efficiency is increased and no additional user action is required in order to launch or position a new window.

BRIEF DESCRIPTION OF THE DRAWINGS

The present invention is illustrated by way of example and not limitation in the accompanying figures in which like reference numerals indicate similar elements and in which:

FIG. 21 is an exemplary graphical user interface for combined switching and window placement, wherein the selected element is displayed in combination with previously open windows;

FIG. 22 is a flow diagram showing an exemplary method for combined switching and window placement;

FIG. 23 is a flow diagram showing another exemplary method for combined switching and window placement.

DETAILED DESCRIPTION

Figure 1:
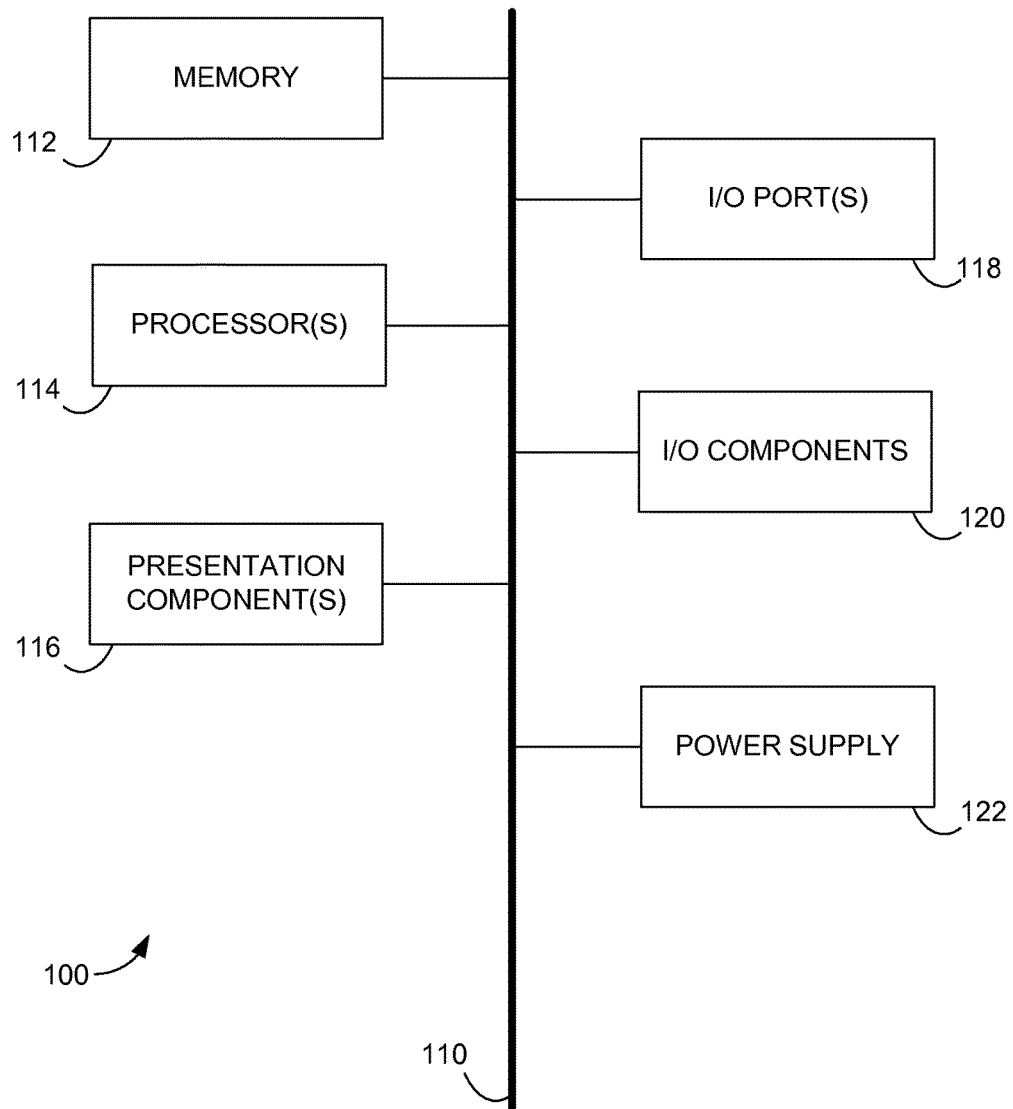
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, computer storage media, and graphical user interfaces (GUIs) for combined switching and placement of windows in a single step operation. This may be done to increase efficiency and improve a user experience by eliminating various steps associated with switching between and placement of windows.

When a user wishes to switch to a new window from one or more current windows, a single step may be taken to automatically initiate (1) launching the selected new window, (2) positioning the selected new window, and (3) switching to a view of the selected new window from a previous view. The previous view may have included the one or more current windows. The single step may be any step configured into the system to be recognized as the single step. In embodiments, the single step is a movement of an element (e.g., a representation of the desired new window) into a snap portion of a display. The snap portion of the display may be any region of a display area configured to identify said single step and initiate the appropriate responses. By combining multiple steps into one, user efficiency is increased and no additional user action is required in order to launch or position a new window.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O component(s) 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. In embodiments, a microphone or other source of audio stream data is included as an I/O component to provide the audio signals necessary for emotion recognition. Other illustrative I/O components include a joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted as search requests, words or symbols appearing in apps available for retrieval in response to input search requests, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" may be often used herein, it will be recognized that this term may also encompass a search engine, a Web browser, a cloud server, a set of one or more processes distributed on one or more computers, one or more stand-alone storage devices, a set of one or more other computing or storage devices, a combination of one or more of the above, and the like.

Figure 24:
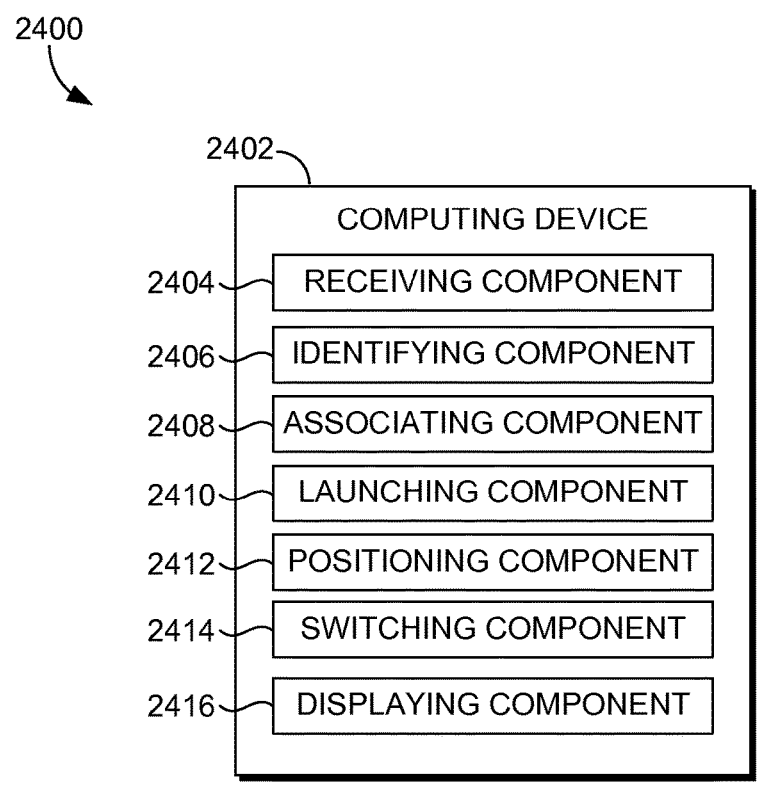
FIG. 24 is a block diagram of an exemplary environment in which embodiments of the invention may be employed.

As previously set forth, embodiments of the present invention provide systems, methods, computer storage media, and graphical user interfaces (GUIs) for combined switching and placement of windows. Turning now to FIG. 24, a block diagram is provided illustrating an exemplary environment 2400 in which embodiments of the present invention may be employed. Generally, the environment 2400 illustrates an environment in which combined switching and placement of windows is performed. Among other components not shown, the environment 2400 is depicted as being embodied on a computing device 2402.

It will be understood and appreciated by those of ordinary skill in the art that the exemplary system 2400 shown in FIG. 24 is merely an example of one suitable computing environment and is not intended to suggest any limitation as to the scope of use or functionality of the present invention. Neither should the exemplary environment 2400 be interpreted as having any dependency or requirement to any single component or combination of components illustrated therein.

Further, logic within the environment 2400 supporting the exemplary environment 2400 may be embodied on an internal processing component to a computing device 2402, provided from a distributed computing environment, such as a remote server (not shown), or any combination thereof. In embodiments of the invention that are practiced in distributed computing environments, logic communication is linked through appropriate connections. These connections may be wired or wireless. Examples of particular wired embodiments, within the scope of the present invention, include USB connections and cable connections. Examples of particular wireless embodiments, within the scope of the present invention, include a near-range wireless network. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the computing device 2402 and a remote server, for instance, are not limited by the examples described, but embrace a wide variety of methods of communications.

Exemplary embodiments include the computing device 2402 for, in part, supporting operation of the various components included within the computing device 2402 (e.g., the receiving component 2404, the identifying component 2406, etc.). In an exemplary embodiment, where the computing device 2402 is personal computer for instance, a displaying component 2416 (e.g., a touchscreen display) may be disposed on the computing device 2402. The computing device 2402 may take the form of various types of computing devices. By way of example only, the computing device 2402 may be a personal computing device (e.g., the computing device 100 of FIG. 1), handheld device (e.g., personal digital assistant), a mobile device (e.g., a laptop computer, cell phone, media player), consumer electronic device, various servers, and the like. Additionally, the computing device 2402 may comprise two or more electronic devices configured to share information therebetween.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

It should be understood that any number of computing devices may be employed in the environment 2400 within the scope of embodiments of the present invention. Each may comprise a single device/interface or multiple devices/interfaces cooperating in a distributed environment. Additionally, other components or modules not shown also may be included within the computing environment 2400.

The computing device 2402 may be configured for, among other things, facilitating combined switching and placement of windows. The computing device 2402 may include, among other things, a receiving component 2404, an identifying component 2406, an associating component 2408, a launching component 2410, a positioning component 2412, a switching component 2414, and a displaying component 2416. The displaying component 2416 may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected.

The receiving component 2404 may be configured for, among other things, receiving an indication to switch to a switcher view (also referred to as an application switcher view) or a switching mode from, for example, a non-switcher view. A switcher view, as used herein, refers generally to a GUI, view, or portion of a display that facilitates switching or transitioning between elements and includes a collection/plurality of elements. An element, as used herein, refers generally to a representation of content to be displayed in a window (e.g., active windows). Examples of elements include representations of files, folders, applications, windows, and the like. Elements may be selected to display, as a window for instance, in a display area of the computing device 2402. For instance, an element (e.g., an icon for a web browser) may be selected to be displayed in a display area of the computing device 2402. Elements are generally discussed herein as representations that are or are able to be displayed as a window such as, as previously mentioned, files, folders, applications, or the like. The representation may be in any form including, but not limited to, icons, thumbnails, identifiers, text lists, or the like.

The switcher view may include a plurality of elements where the elements displayed in the switcher view may be active windows, recently opened elements (e.g., the element such as a file, application window, person, etc., was open at a first time that is less than a threshold number of minutes/hours before a second time), frequently opened elements (e.g., elements that are opened a number of times that exceeds a predetermined threshold or elements that are opened a number of times that exceeds a predetermined threshold for a given period of time), user-selected elements (e.g., a user has designated a particular element to consistently be presented in a switcher view), and the like.

Figure 2:
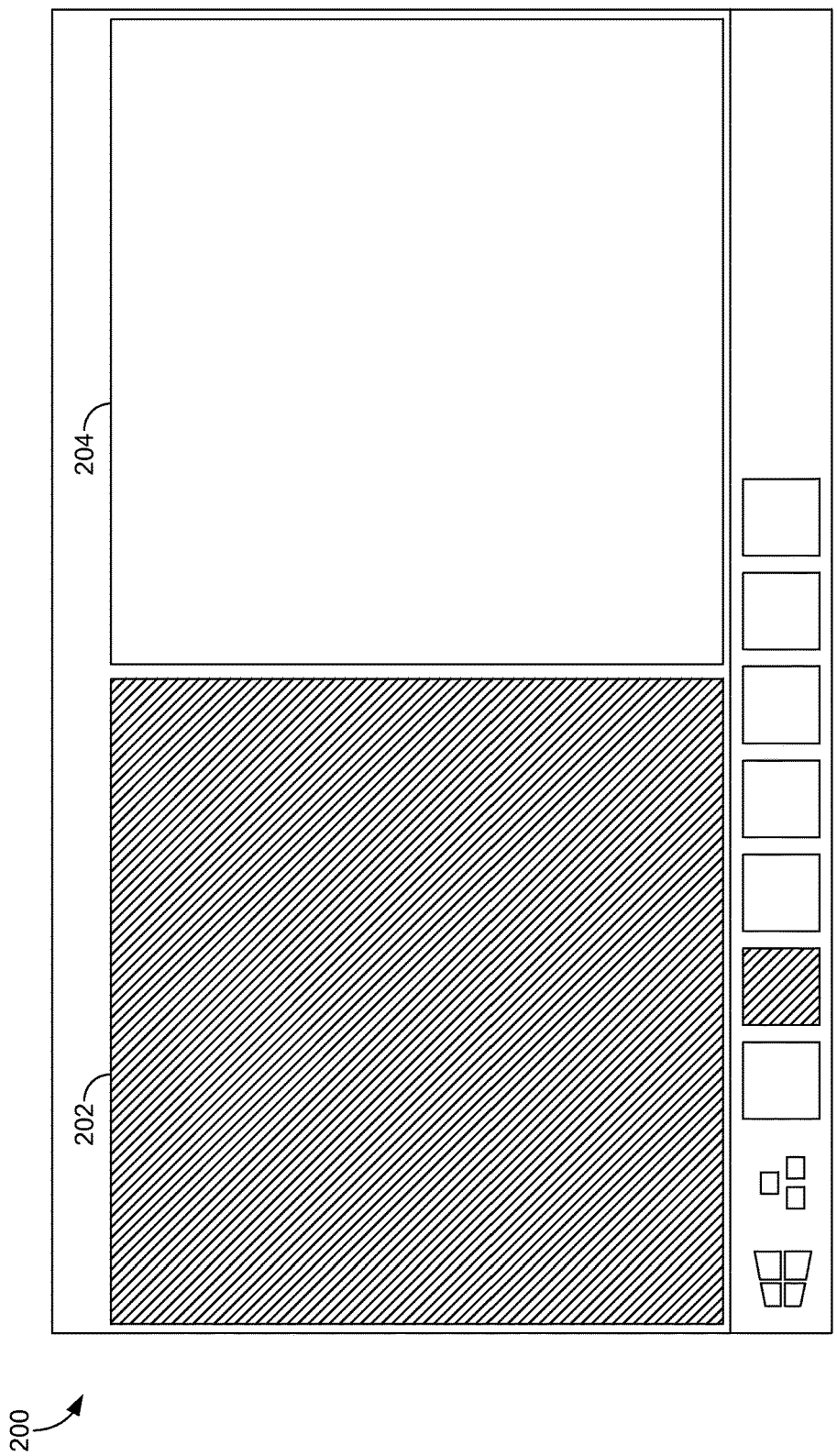
FIG. 2 is an exemplary graphical user interface for combined switching and window placement, wherein two windows are currently open in a display area.

The switcher view (or mode) may be enabled to facilitate launching windows, switching views of windows, and placement of windows resulting from a single action. The switcher view may be enabled from the non-switcher view by, for instance, a user selection, a user input, a gesture, and the like. The non-switcher view may be any view of a display that does not include a switcher view. For instance, the non-switcher view may be a desktop of a computing device, a window currently displayed on a computing device (e.g., a document, web page, etc.), and the like. An exemplary non-switcher view is illustrated in FIG. 2. FIG. 2 includes a non-switcher view interface 200 that includes a first window 202 and a second window 204. The windows may represent any type of element or target displayed in a window such as a document, a web page, etc., and may be different from one another.

The switcher view allows for a single action to initiate a series of events as a result of the single action. A single action may be any action preconfigured into the computing environment 2400 (operating system) to be recognized as the single action. In an embodiment, the single action is moving an element into a snap portion of a display or a hot spot of a display. The series of events that result from a single action may include, among other things, launching and opening the element moved into the snap portion of the display, positioning a view of the element in a position on the display (either arbitrary or predetermined as will be discussed below), and switching to a view of the element. The snap portion of the display may be any region of a display area configured to identify said single step and initiate the appropriate responses. In an embodiment, the snap portion is a corner of the display. In another embodiment, the snap portion is an edge of a display area. The snap portion may automatically be enabled in the switcher view and not enabled in a non-switcher view such that movement of an element over a snap portion of the display in a non-switcher view will not result in automatic combined switching and placement of the element as it will in a switcher view.

Figure 3:
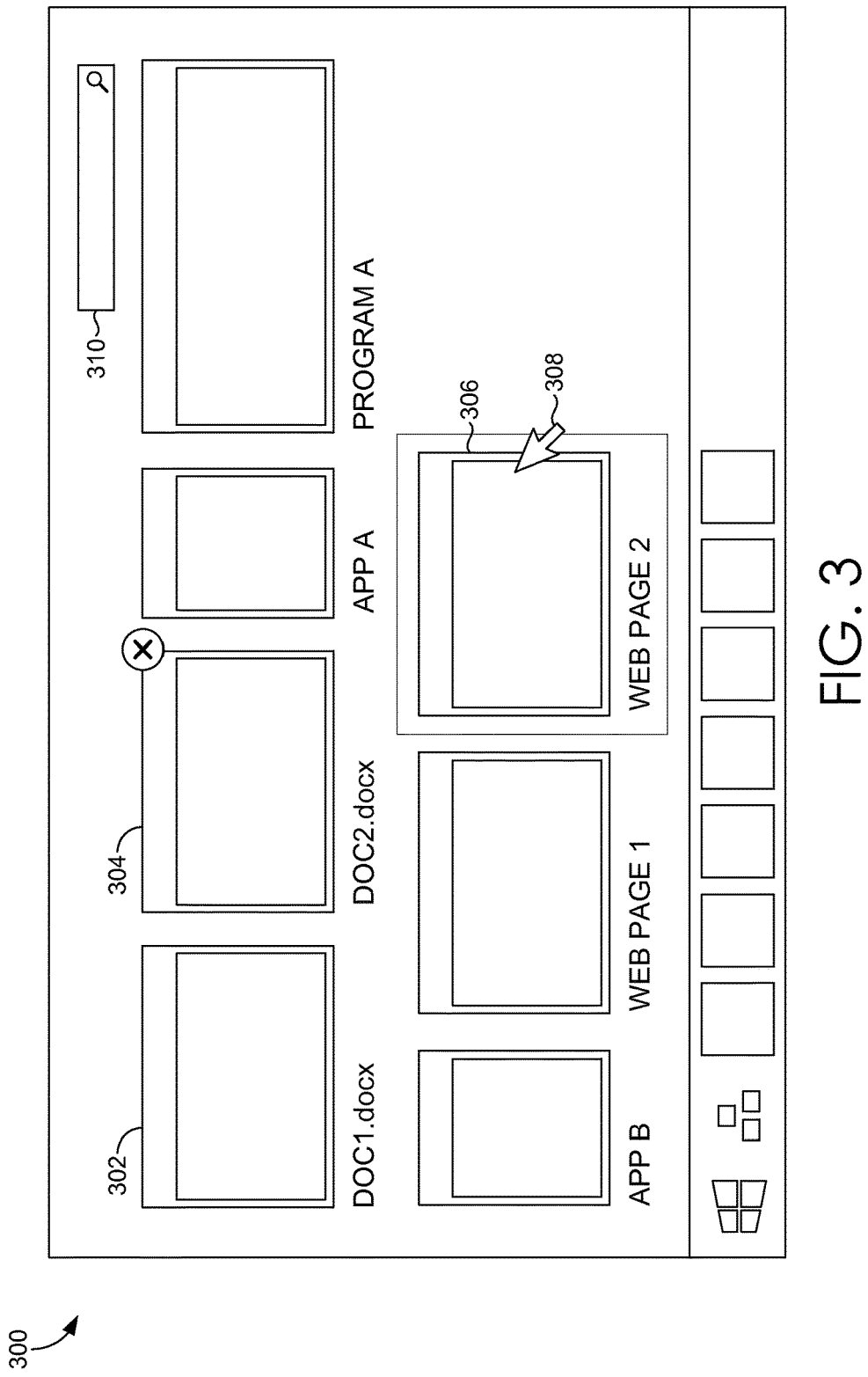
FIG. 3 is an exemplary graphical user interface for combined switching and window placement illustrating a switcher view.

FIG. 3 illustrates an exemplary switcher view interface 300. The switcher view interface 300 includes a plurality of elements including element 302, element 304, and element 306. As previously indicated, an element may be selected in the switcher view interface 300 to indicate a desire to switch to the element as indicated by the selection 308. The switch indication may be to switch to the element completely (e.g., display the selected element alone in a full screen view) or to display the element in combination with one or more previously displayed windows (e.g., other active windows), such as the first window 202 and the second window 204 of FIG. 2. The element may be selected by, for instance, an input device such as a mouse, a gesture, an input on a touch-screen, a voice command, etc.

Figure 4:
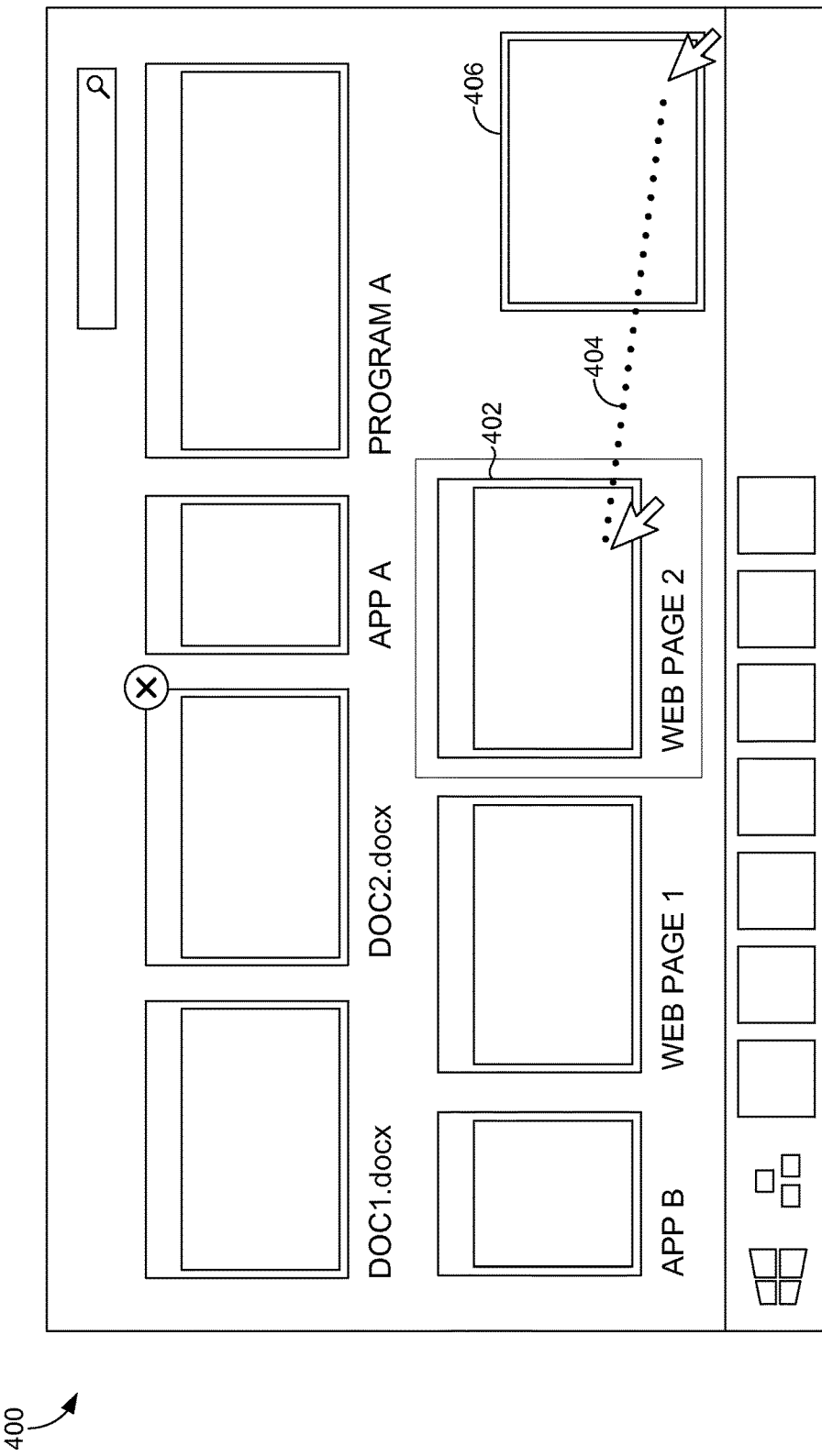
FIG. 4 is an exemplary graphical user interface for combined switching and window placement, wherein an element is being moved to a snap portion of a display.
Figure 5:
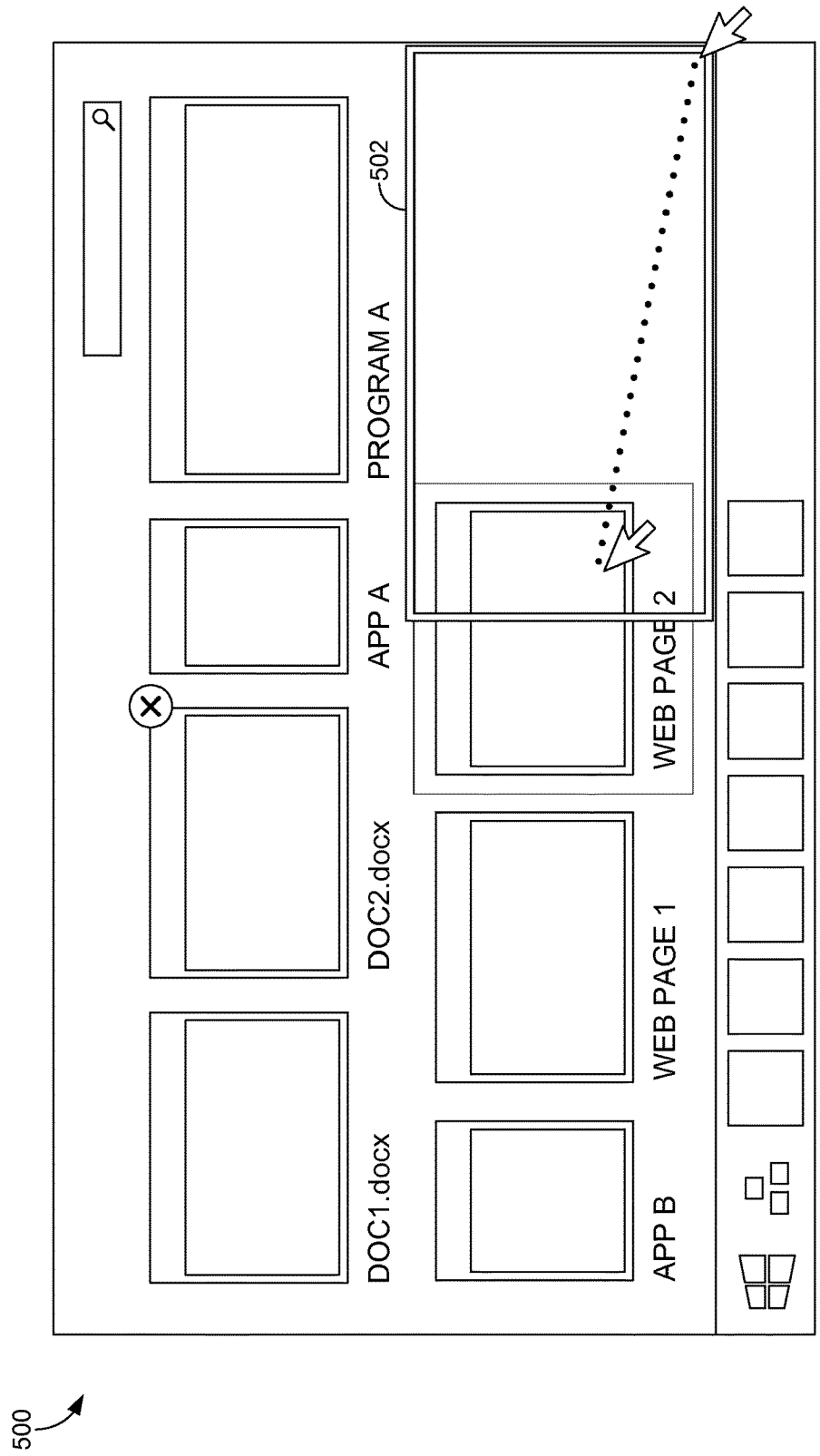
FIG. 5 is an exemplary graphical user interface for combined switching and window placement, wherein the selected element is being launched and positioned.

Returning now to FIG. 24, the identifying component 2406 may be configured for, among other things, identifying when an element is moved into a snap portion of a display. As previously mentioned, the snap portion may be any portion of a display configured to identify when an element is moved within the snap portion. In an embodiment, the snap portion is a corner of a display area. FIG. 4 illustrates said movement of an element into a snap portion of a display. FIG. 4 provides a GUI 400 of a switcher view where the element 306 has been selected as indicated by selection 402 and moved 404 toward a snap portion of the display. FIG. 5 illustrates a GUI 500 switcher view where an element is in a snap position 502 (i.e., the element is within the snap portion of the GUI 500).

Once an element is identified (by, for instance, the identifying component 2406) within a snap portion of a display area, the associating component 2408 may be configured for, among other things, associating a position with the element or a layout with the display area or a combination thereof. A position associated with an element may be an arbitrary position (e.g., wherever a user positions the element on the display area) or a predetermined position associated with the user, the element, the snap portion utilized to place the element, and the like. For instance, a user may designate that Element 1 is to be opened in a particular location of a display area. Alternatively, an element may be positioned in a lower right hand corner of a display area if a lower right hand corner snap portion is utilized to open and position the element while an element that is opened and positioned using a snap portion of an upper left hand corner of a display area may be placed in the upper left hand portion of the display area. In FIG. 5, for example, the element may be configured to be displayed in a bottom right hand corner of GUI 500 since the bottom right hand corner snap portion was utilized to open and position the element. The present application refers to placement of an element and placement of a view of an element. Each is referring to placing either the element itself or the resulting view of the element (when launched) in a predetermined position.

Figure 6:
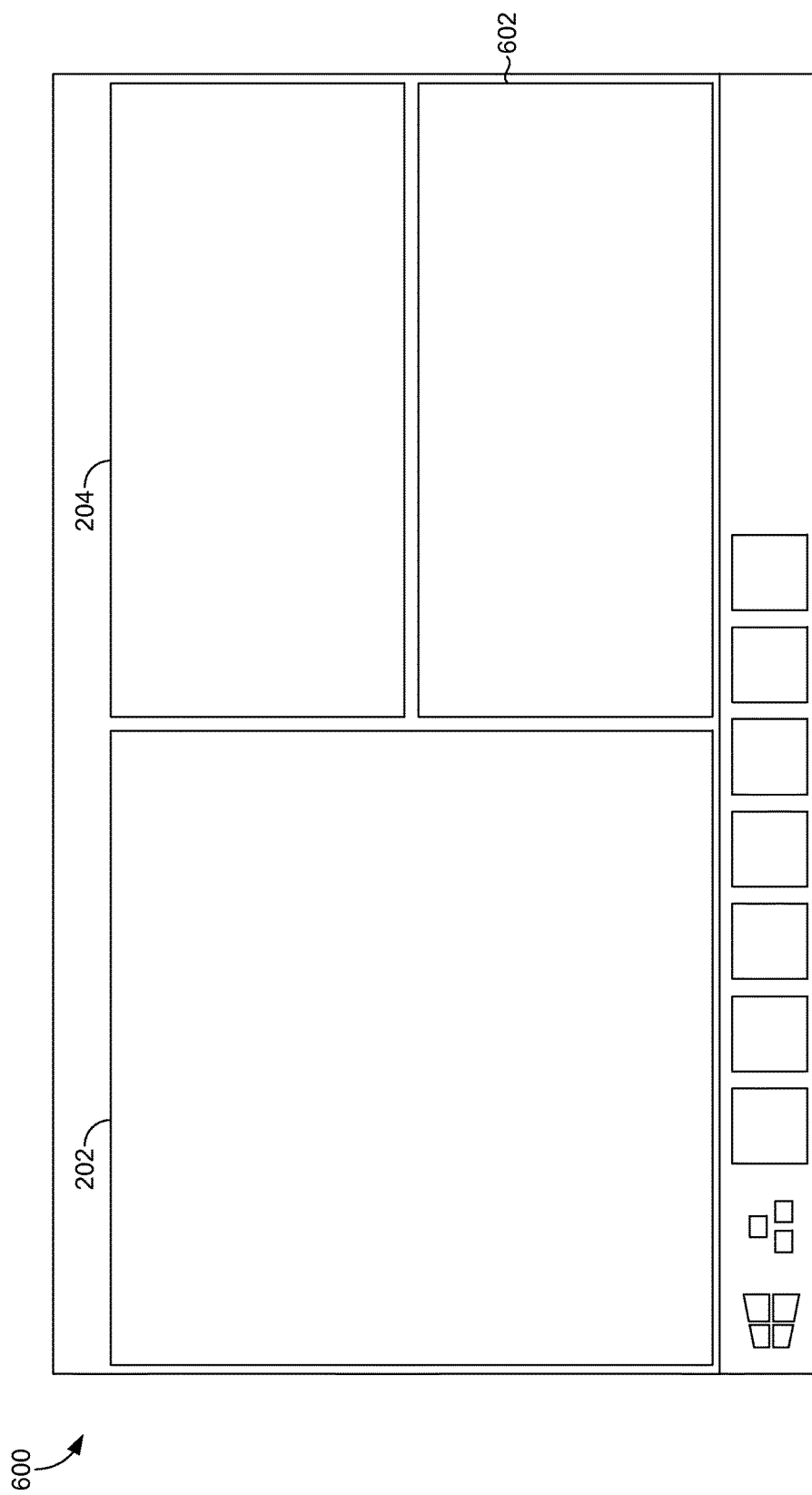
FIG. 6 is an exemplary graphical user interface for combined switching and window placement, wherein the selected element is displayed in combination with previously open windows.

Said launching and positioning may be executed by, for example, the launching component 2410 and the positioning component 2412. Such launching and positioning is illustrated in GUI 600 of FIG. 6. Element 602 is positioned in a predetermined location and launched in combination with the first window 202 and the second window 204 of FIG. 2. Alternatively, element 602 may have been launched and positioned in a full screen view, half screen view, partial screen view, or any other position within the display area of GUI 600. The view is automatically switched from a switching view to a view of the element 602 by, for example, the switching component 2414. The view of the element 602 is in combination with the first window 202 and the second window 204 in this example but could have been switched to a view of just the element 602. The view of the element is displayed by, for example, the displaying component 2416.

Figure 7:
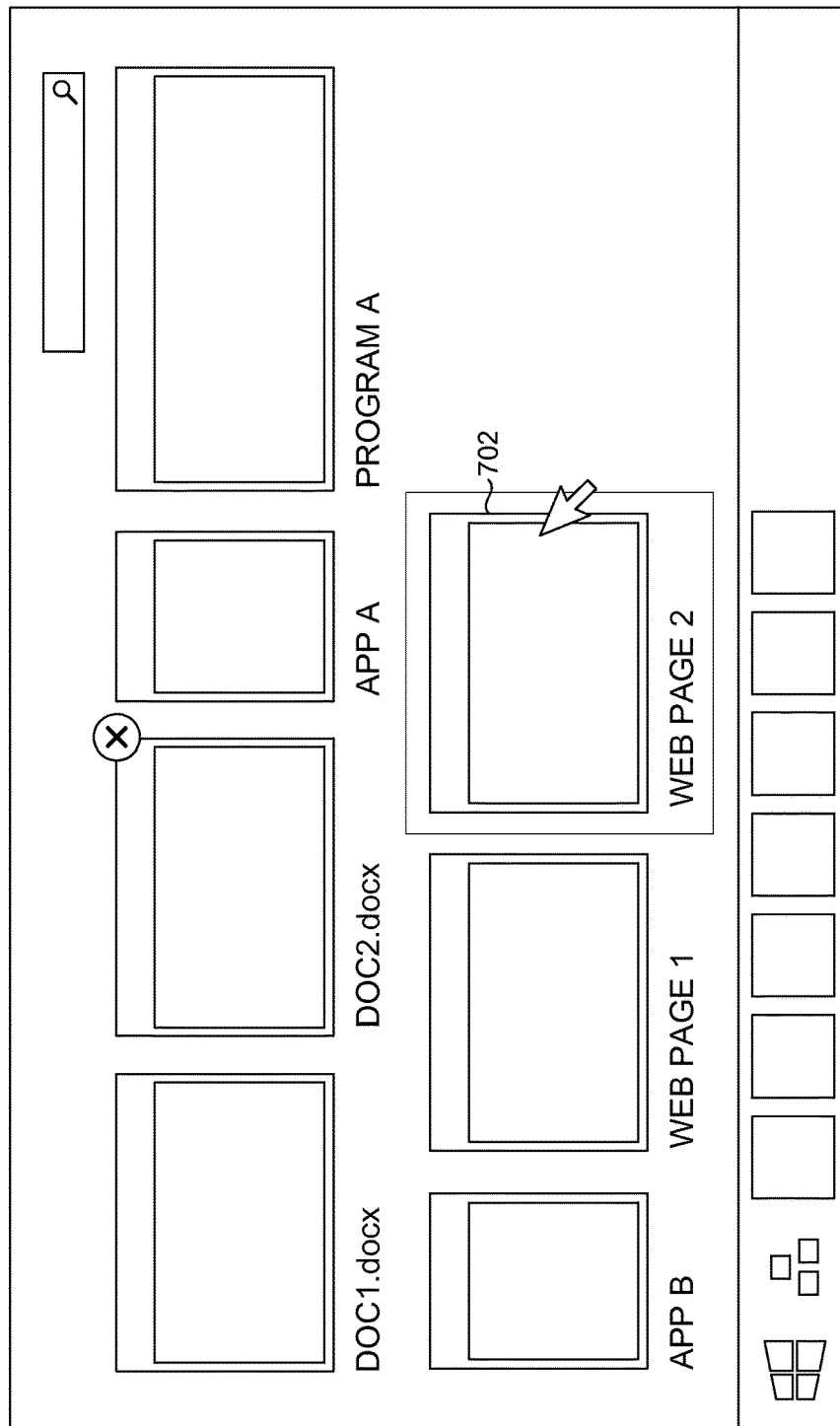
FIG. 7 is an exemplary graphical user interface for combined switching and window placement illustrating a switcher view.
Figure 8:
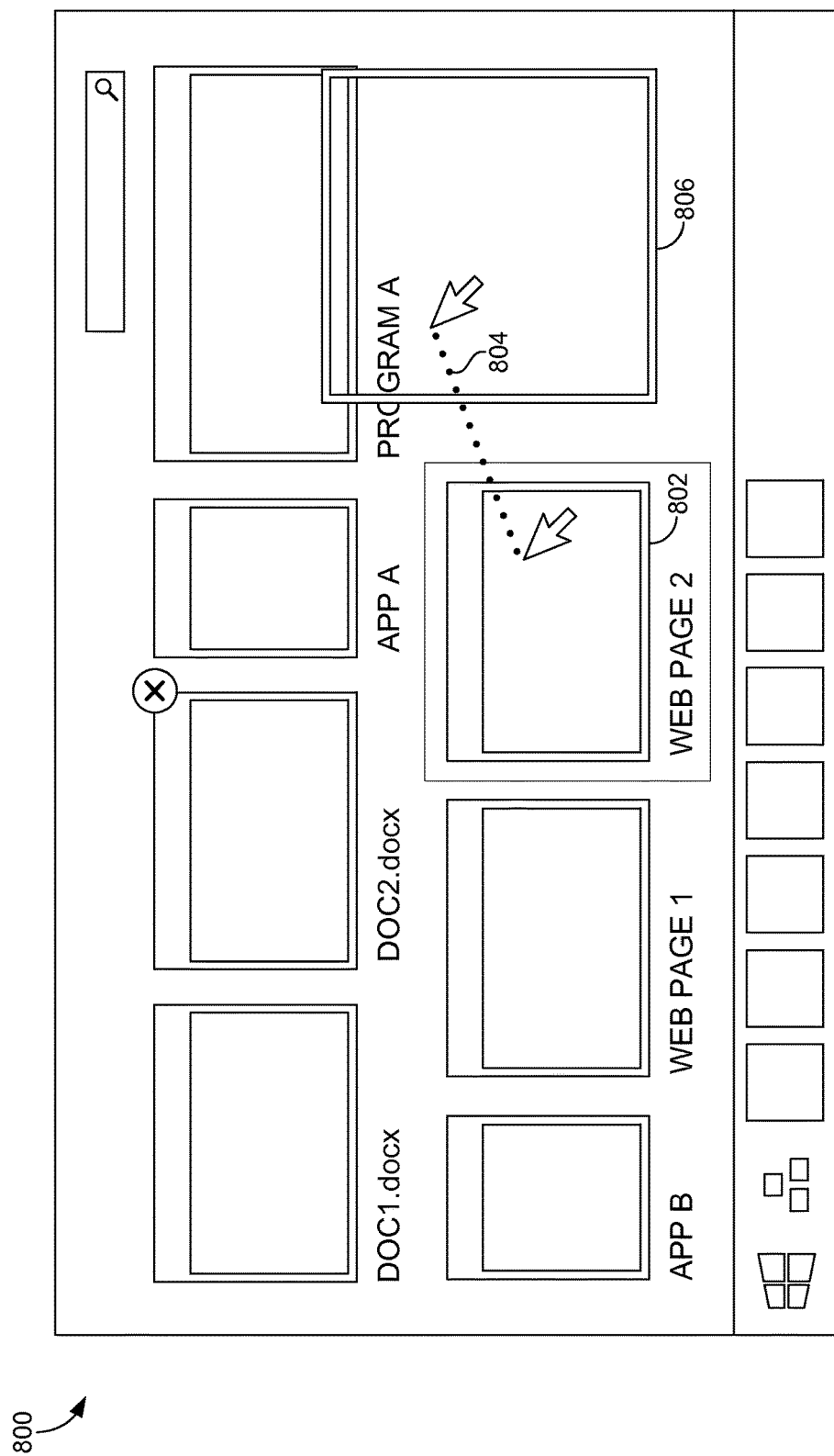
FIG. 8 is an exemplary graphical user interface for combined switching and window placement, wherein an element is being moved to a snap portion of a display.
Figure 9:
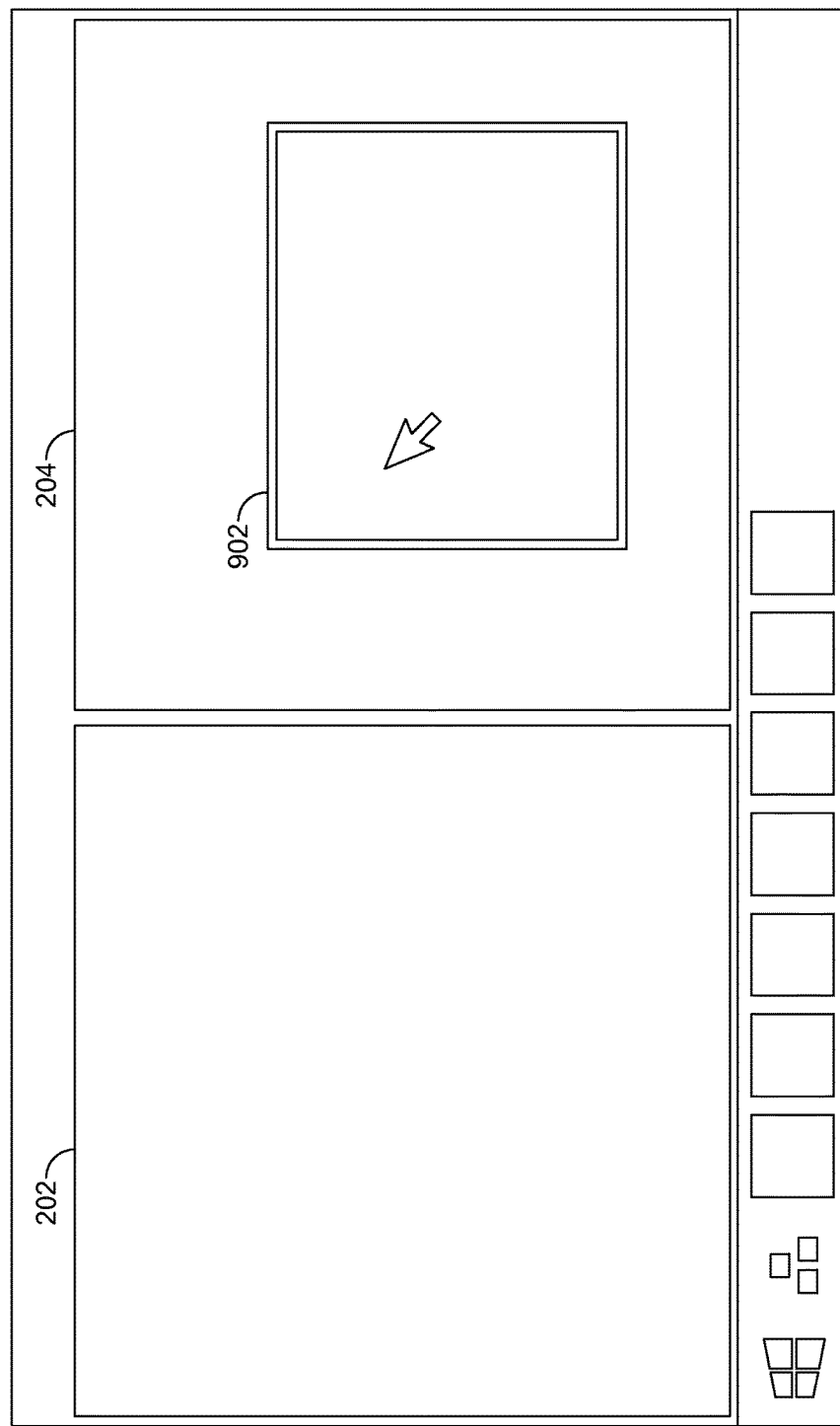
FIG. 9 is an exemplary graphical user interface for combined switching and window placement, wherein the selected element is displayed in combination with previously open windows.

Additionally, a hot spot may be located in any position designated by a user on a display area to position elements in different locations on the display. For example, FIG. 7 provides a GUI 700 of a switcher view where element 702 is selected. FIG. 8 illustrates a GUI 800 of the switcher view where an element 802 (previously illustrated as element 702 in FIG. 7) is moved via movement 804 to a hot spot at an arbitrary location of the GUI 800. The element is positioned at position 806 over the hot spot (not shown). The resulting display may be as illustrated by GUI 900 of FIG. 9 where the first window 202, the second window 204, and the element 902 (previously illustrated as element 802 of FIG. 8 and element 702 of FIG. 7) are simultaneously presented. The element 902 may be presented overlapping with the window 204 as is shown in FIG. 9 or it may be presented on its own in the same location but without window 204 behind it.

In embodiments, rather than an identified hot spot, the entire display area may be configured such that any location on the display area is configured for placement of a window. In other words, an element may be dragged to any location in the display area (e.g., every point on the display area) in order to place a window.

Figure 10:
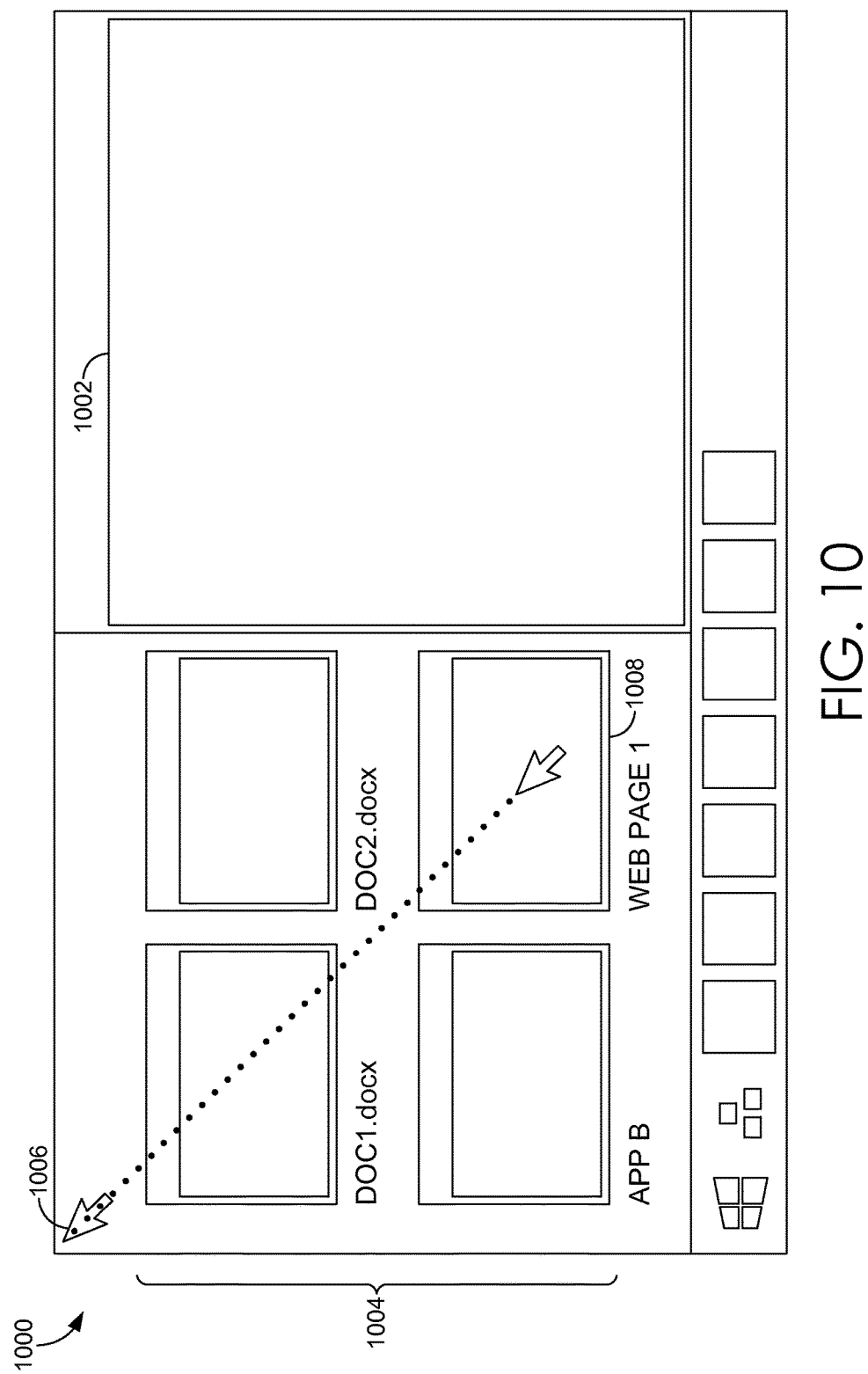
FIG. 10 is an exemplary graphical user interface for combined switching and window placement illustrating a half screen switcher view, wherein an element is being moved to a snap portion of a display.

Turning now to FIG. 10, a GUI 1000 is provided to illustrate a half screen switcher view. A first portion of the screen (right hand side) displays a window 1002 (perhaps, for instance, window 204 of FIG. 2) including content which may be, for example, a web page, a document, an image, a video, or the like. The second portion of the screen (left hand side) displays a reduced switcher view 1004 (i.e., less than a full screen switcher view). The reduced switcher view 1004 may be configured to display elements in a tile fashion (as shown) or alternatively, in a list format or thumbnails, given the reduced space with which to display a collection/plurality of elements. Element 1008 may be selected from the reduced switcher view 1004 and moved to a snap portion 1006 of the GUI 1000. The movement into the snap portion 1006 alone is all that is needed to initiate the series of events (launching, opening, positioning, and switching to a view of the element).

Figure 11:
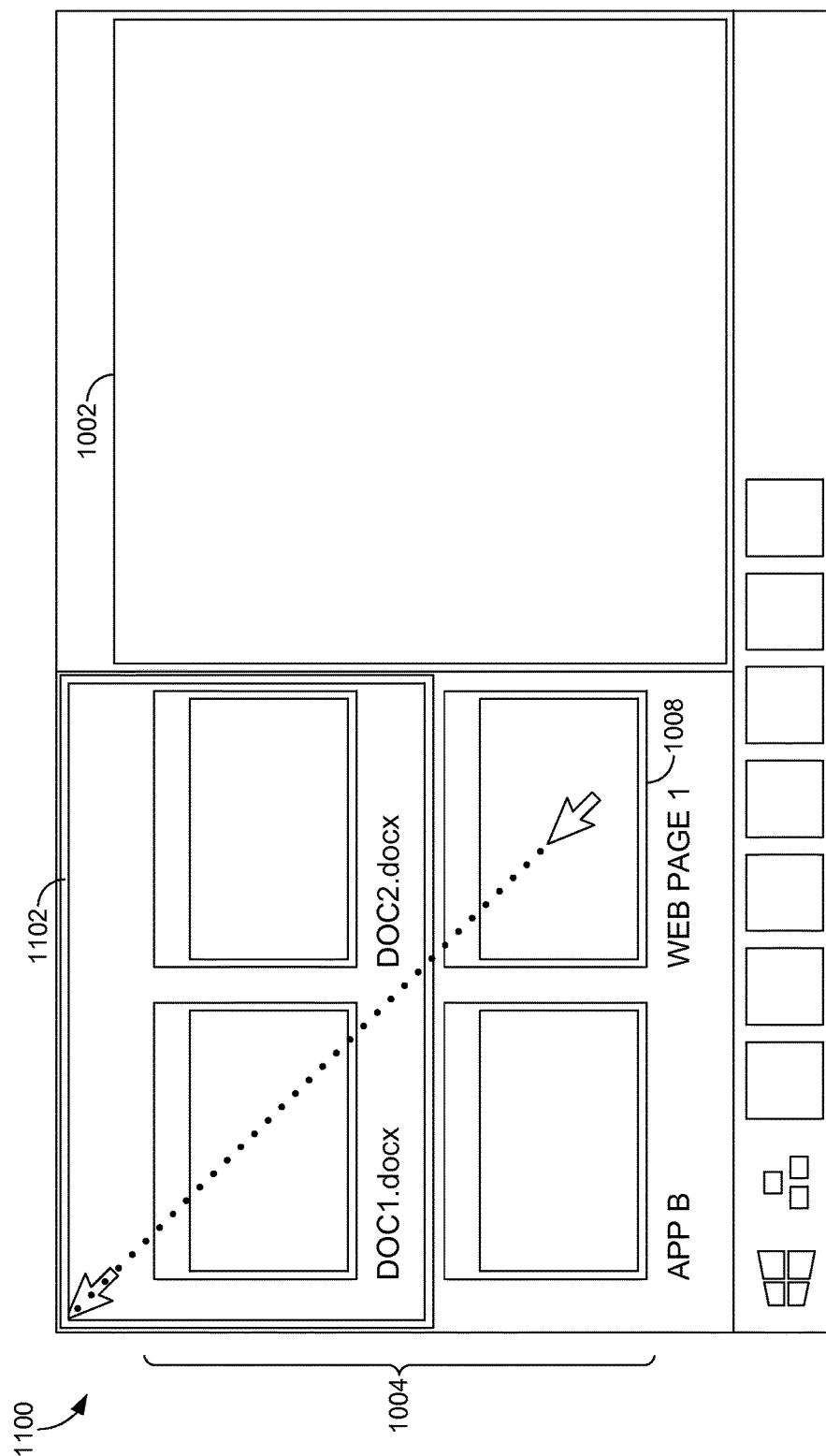
FIG. 11 is an exemplary graphical user interface for combined switching and window placement, wherein the selected element is being launched and positioned.
Figure 12:
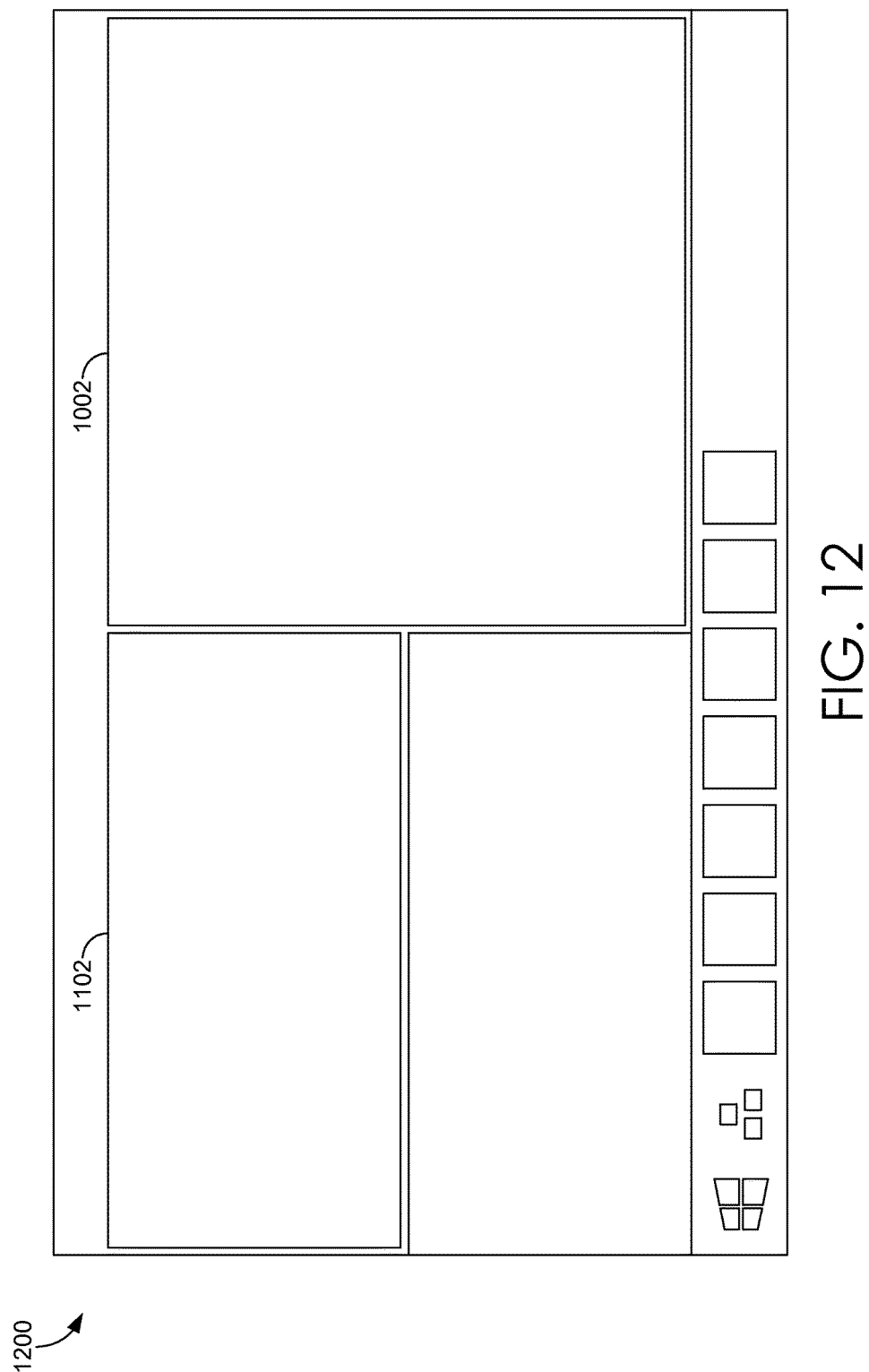
FIG. 12 is an exemplary graphical user interface for combined switching and window placement, wherein the selected element is displayed in combination with previously open windows.

In accordance with an embodiment, when element 1008 is moved to the snap portion 1006 in the upper left hand corner of GUI 1000, the element 1008 is positioned in the upper left hand corner of the GUI 1000 as illustrated in FIG. 11. FIG. 11 provides a GUI 1100 where the window 1002 and reduced screen switcher 1004 are still visible but the element 1008 is being positioned in position 1102. The resulting display may be similar to the display provided in FIG. 12 as GUI 1200 where window 1002 and element 1102 are displayed at the same time.

When an element is displayed, it may be referred to as a target. A target, as used herein, refers generally to a final destination or what is presented in a new window (resulting from selection of an element). Example targets include documents, web pages, and the like. For example, an exemplary element may be an icon for a web browser and the target may be a particular web page. However, for simplicity, the present application may describe a target as an element in order to easily identify the selection and display of an element or item throughout. Thus, the term 'element' may be used interchangeably with the term 'target'.

Figure 13:
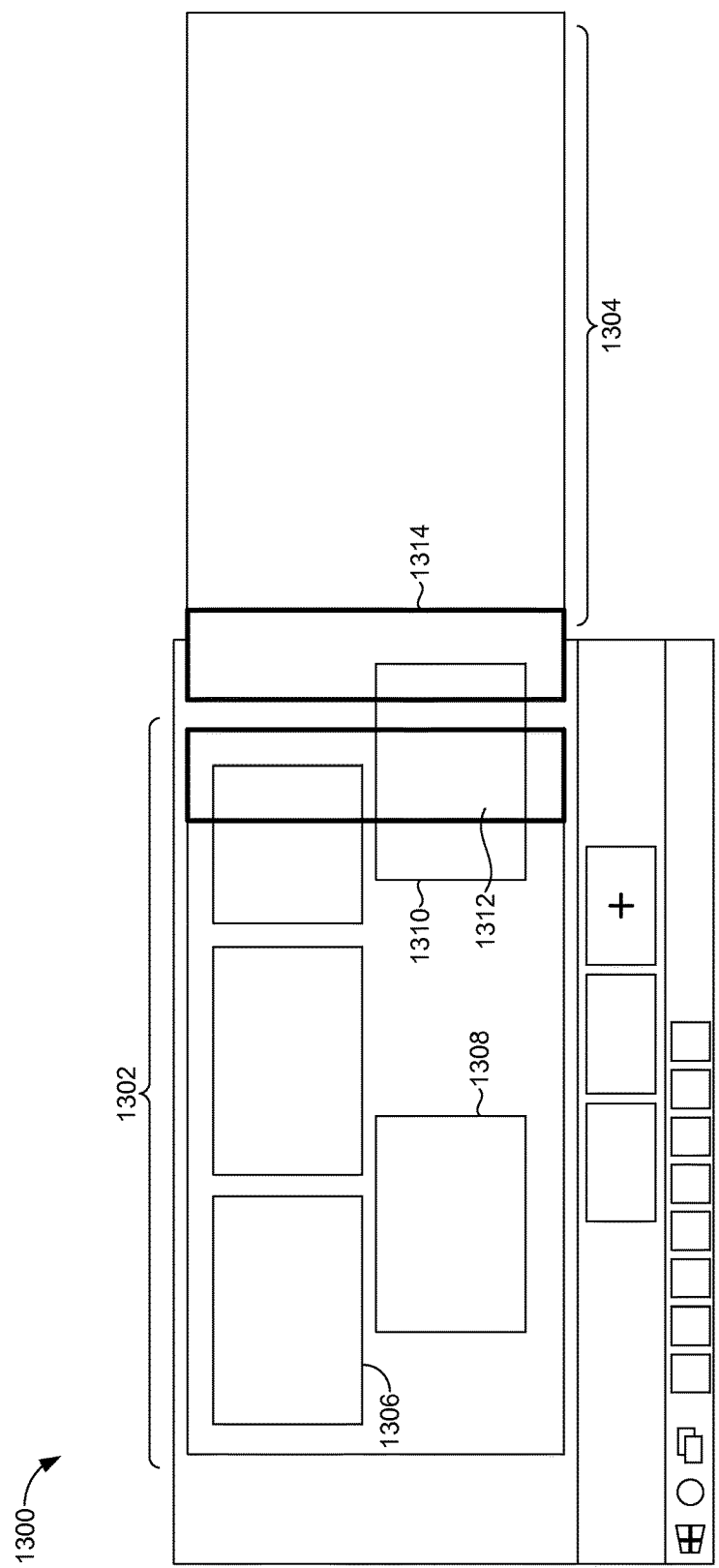
FIG. 13 is an exemplary graphical user interface for combined switching and window placement with more than one display area.

Turning now to FIG. 13, an additional embodiment is provided. A GUI 1300 is displayed across, for instance, two screens. The two screens may be two monitors of a computing device. Further, one screen may be a virtual desktop. Embodiments of the present invention are applicable to implementation on multiple display areas. For example, FIG. 13 provides a first display 1302 and a second display 1304. The first display 1302 comprises a plurality of elements from, for example, a switcher view including element 1306, element 1308, and element 1310. A hot spot 1312 has been highlighted for ease of view. When multiple displays are involved, similar to a single display, a hot spot or snap portion may be used to initiate a series of events in response to a single action of moving an element into either the hot spot or the snap portion. Moving the element 1310 into the hot spot 1312 alone may result in positioning of the element 1310 on the first display 1302. Alternatively, the element 1310 may be moved into both the hot spot 1312 and a desktop switch area 1314 (highlighted for ease of view) to both position the element on and switch to the second display 1304.

Figure 14:
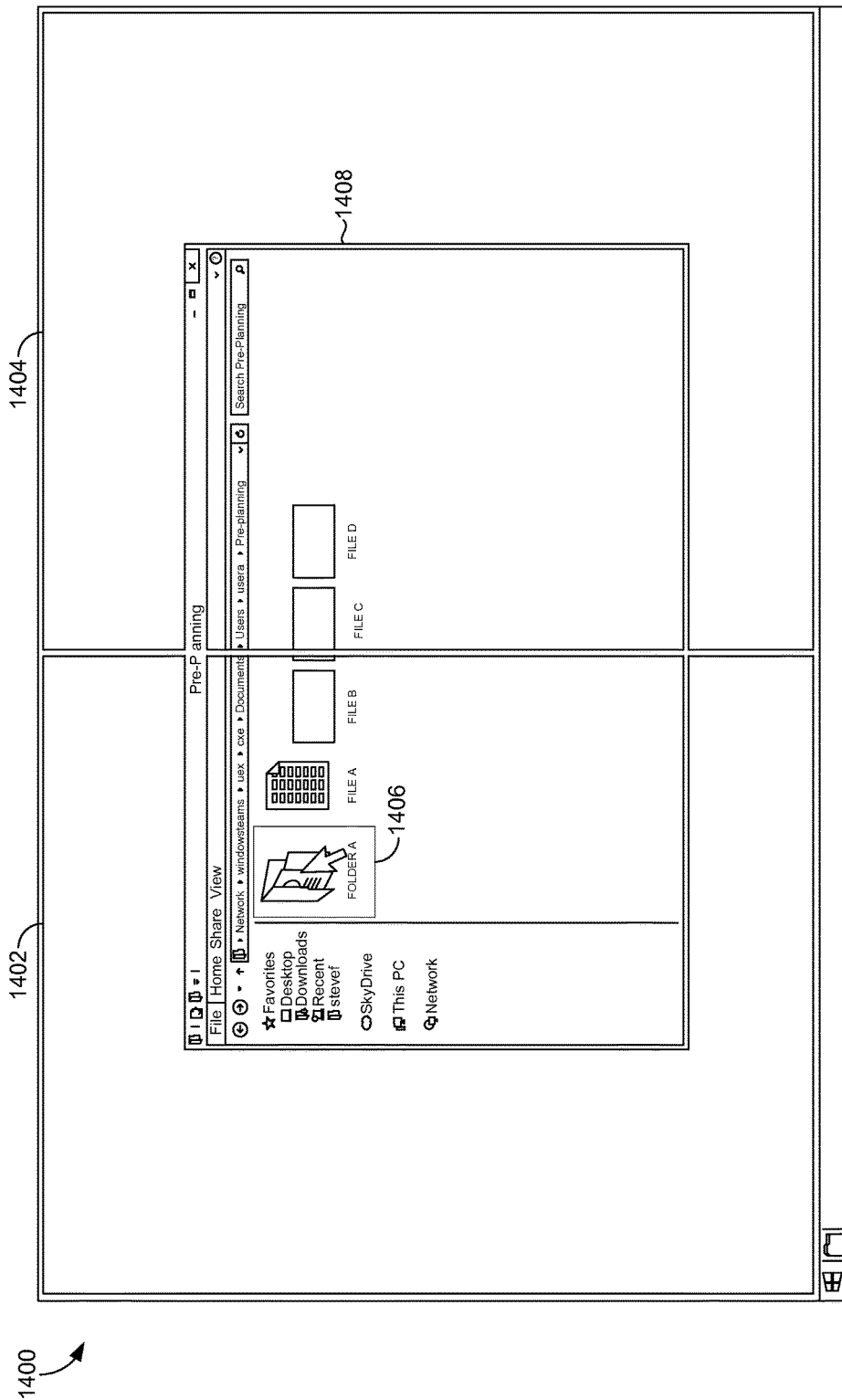
FIG. 14 is an exemplary graphical user interface for combined switching and window placement with more than one display area.
Figure 15:
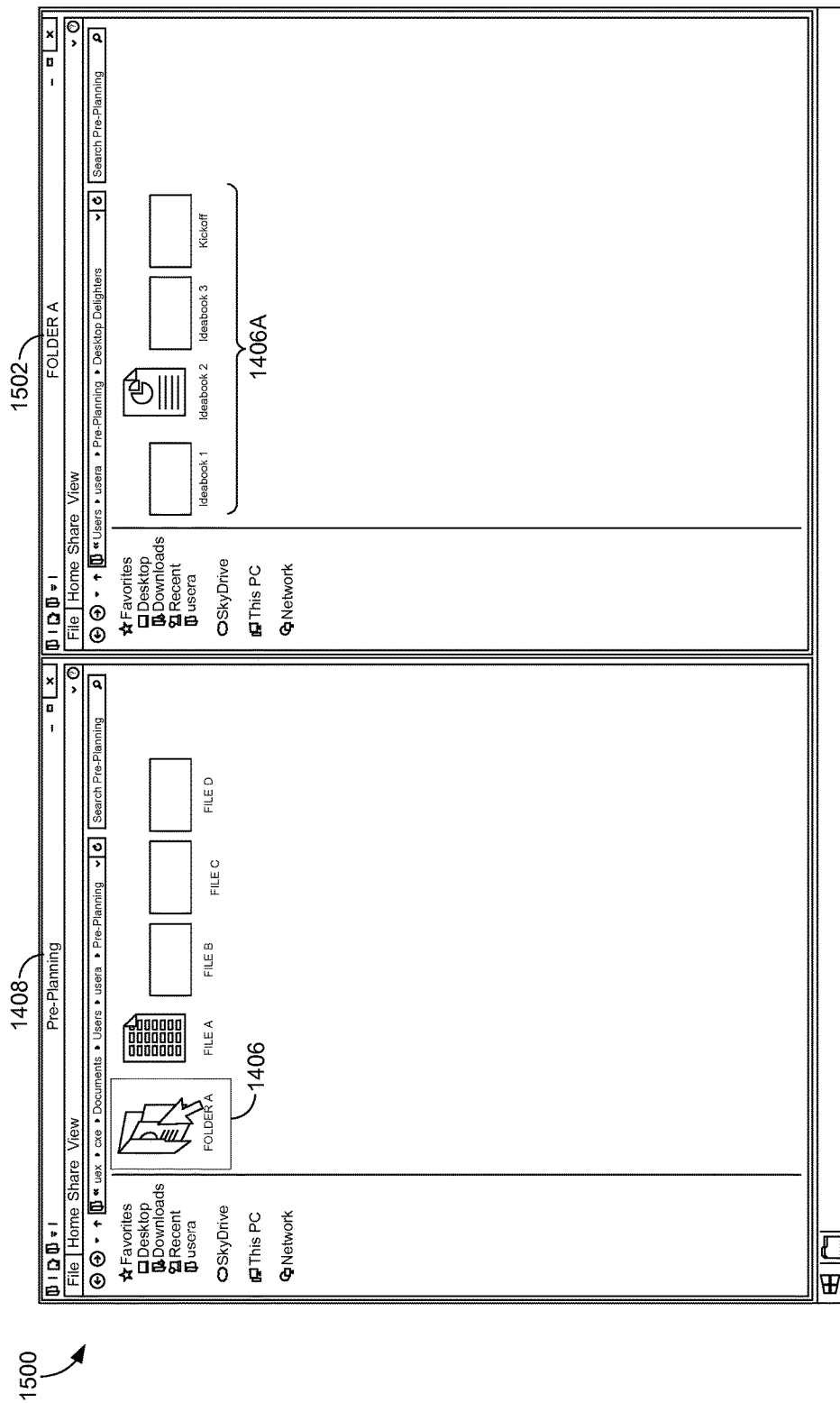
FIG. 15 is an exemplary graphical user interface for combined switching and window placement with more than one display area.

Turning now to FIG. 14, a GUI 1400 is provided that illustrates the combined switching and placement of windows with respect to a file/folder. GUI 1400 includes a first window 1402, a second window 1404, a third window 1408, and an element 1406. The element 1406 is a folder in this example. A snap portion or hot spot (not shown) is also included in the GUI 1400. When the element 1406 is moved to a snap portion or hot spot, the element 1406 is opened to display a target depicted as target 1502 in FIG. 15 and positioned within the display area. The target 1502 includes contents 1406A of element 1406. In FIG. 15, the target 1502 is illustrated as being displayed side-by-side with window 1408 but target 1502 may be displayed in any manner desired by the user. For instance, the target 1502 could have been associated with a location specific to a snap portion (e.g., a particular corner of the GUI 1500) or it could have been located relative to a hot spot in a middle portion of the screen. In this particular example, a position associated with target 1502 displayed the two windows (target 1502 and window 1408) side-by-side.

Additionally, FIG. 14 may also be used to illustrate an embodiment associated with a file. For instance, any one of the files of FIG. 14 (e.g., File A, File B, File C, etc.) may be moved to a, for example, hot spot of a display area. Movement of the file to a hotspot results in both the file being opened in a correct application (e.g., a spreadsheet file opened in a spreadsheet application) and being snapped into place.

Figure 16:
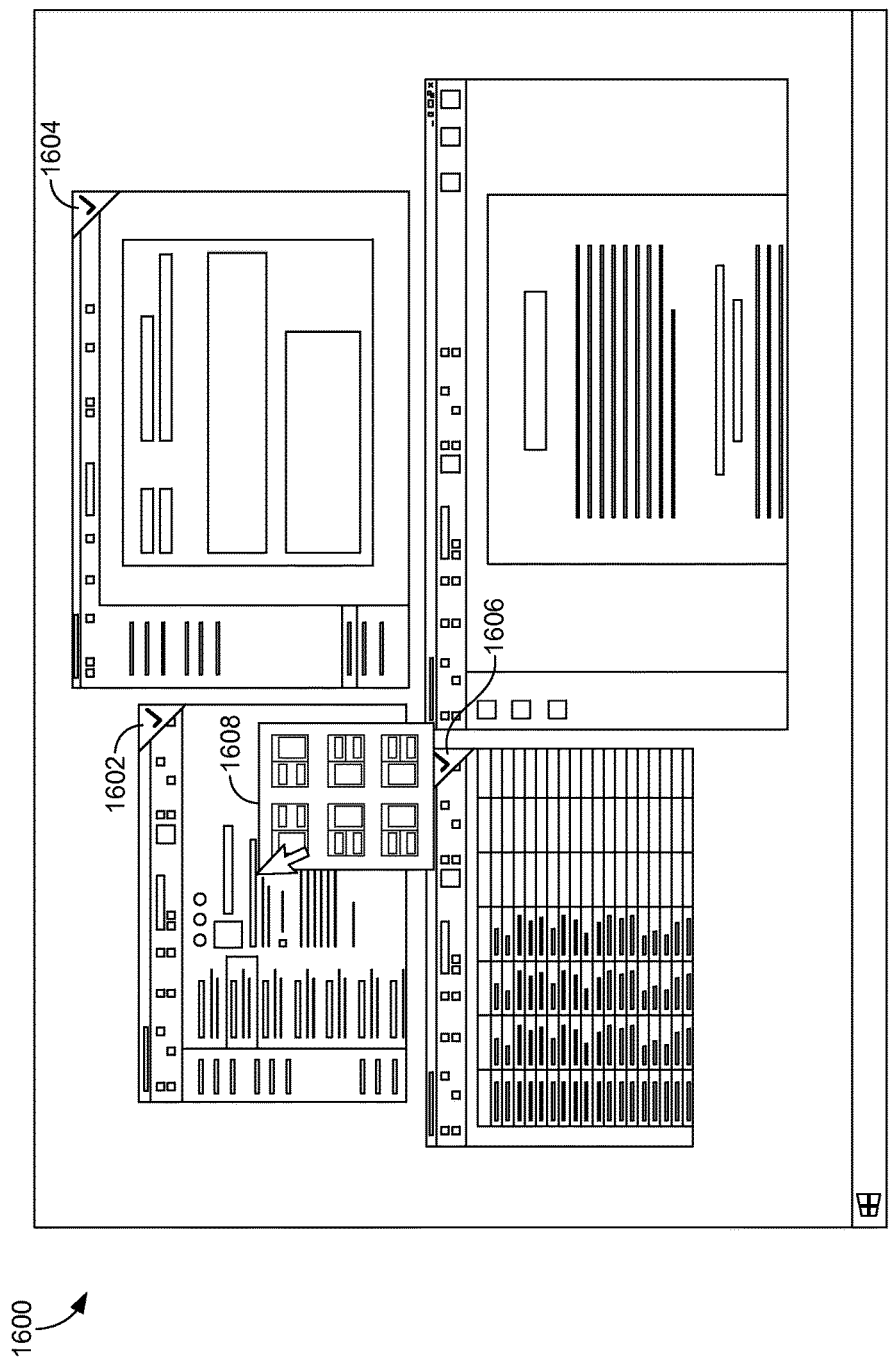
FIG. 16 is an exemplary graphical user interface for combined switching and window placement illustrating layout selection.
Figure 17:
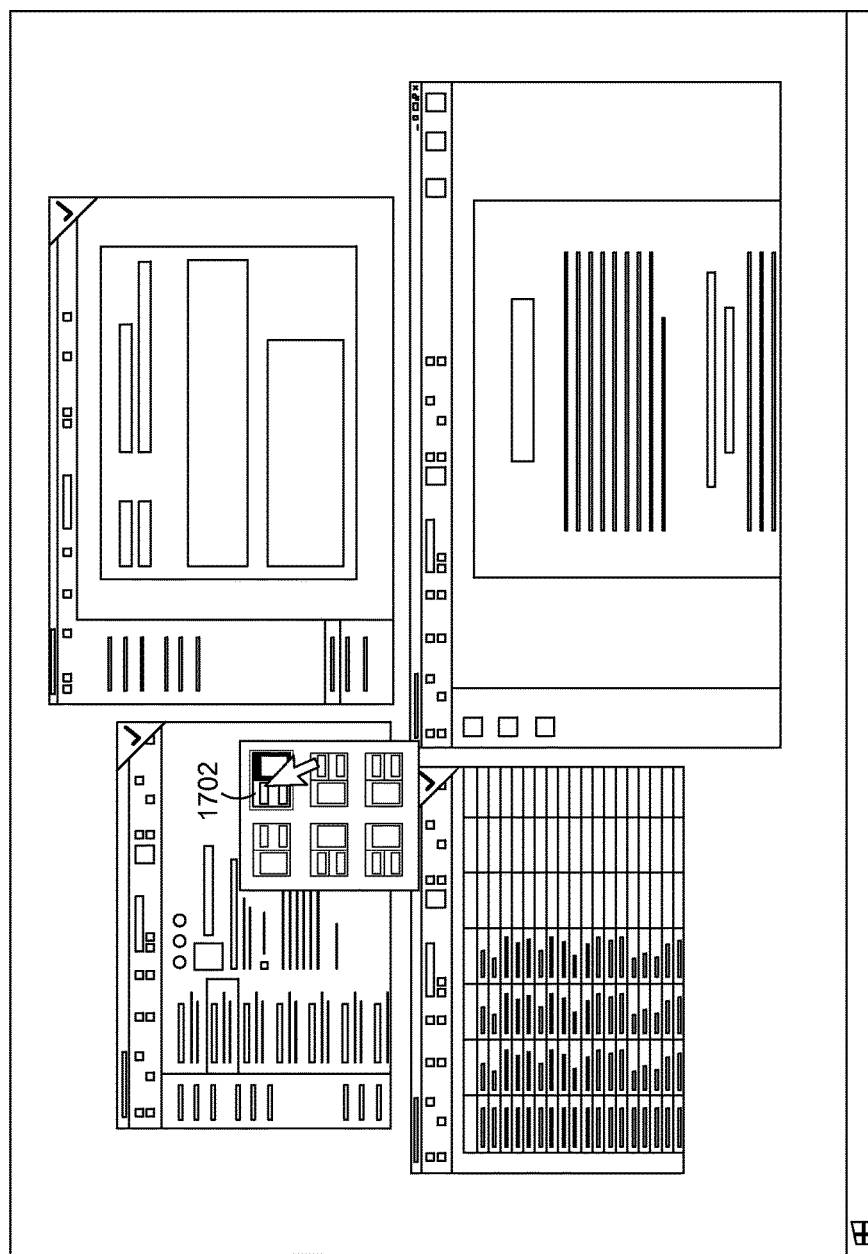
FIG. 17 is an exemplary graphical user interface for combined switching and window placement illustrating layout selection.
Figure 18:
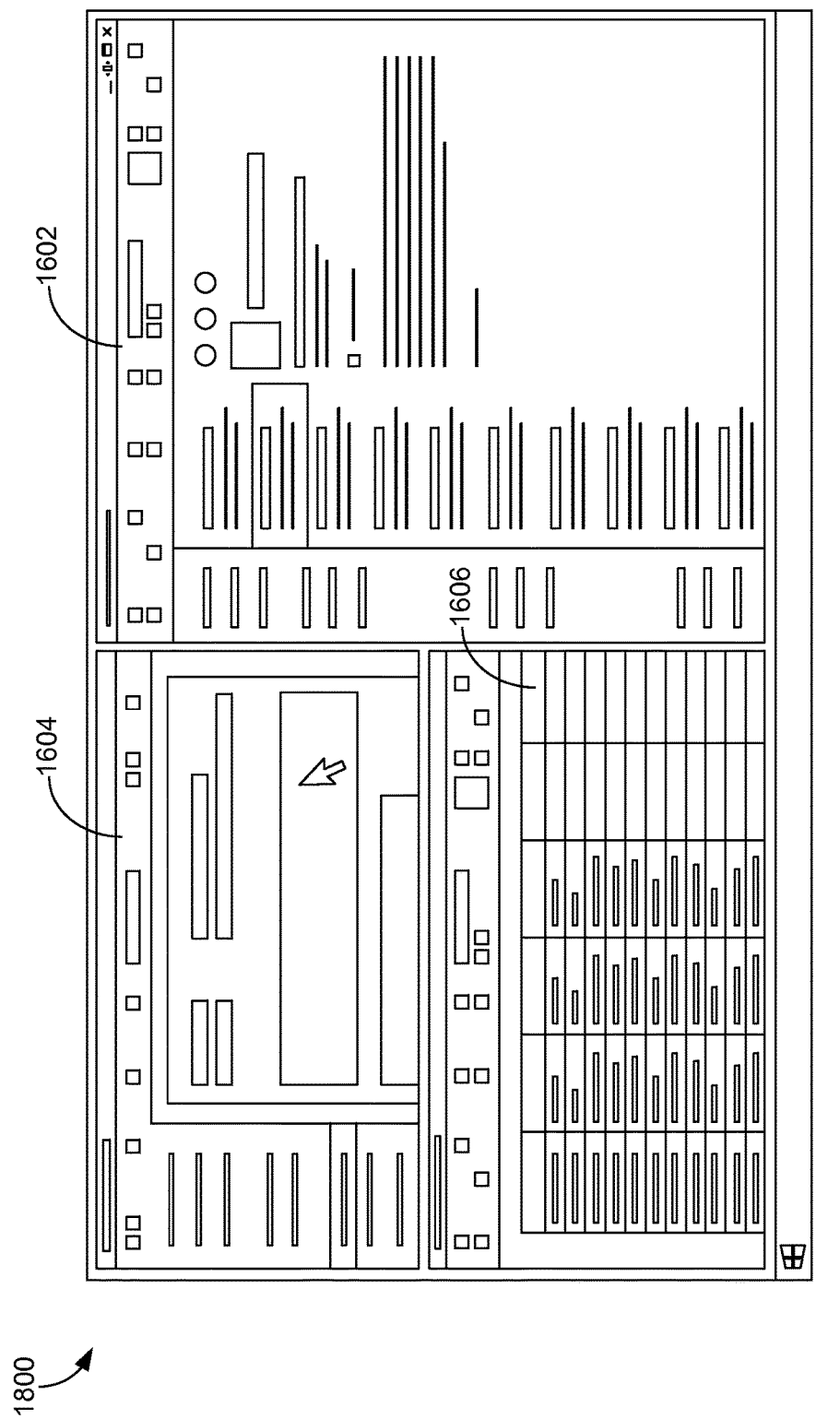
FIG. 18 is an exemplary graphical user interface for combined switching and window placement illustrating layout selection.

FIG. 16 provides a GUI 1600 illustrating a layout selection embodiment. The layout selection embodiment may be automatically enabled when more than one element is selected for combined switching and placement. Layout selection may also be enabled when a single element is selected if a user wishes to enable the feature. GUI 1600 includes a first element 1602, a second element 1604, and a third element 1606, each having been selected as indicated by the check box in the upper right hand corner of each element. Selection may be indicated in any other manner recognized in the art. Upon selection of more than one element, a layout selection option 1608 may be displayed. The layout selection option 1608 may include one or more layouts in which to display the elements, one or more previously open windows, or a combination thereof. Thus, if one or more windows are currently open, the layout selection option 1608 may include layouts to accommodate the number of elements selected plus the number of windows that are already open. In this example, three elements have been selected (i.e., first element 1602, second element 1604, and third element 1606) so a plurality of layouts are displayed that accommodate at least three elements or windows. A layout may be selected directly from the layout selection option 1608 and said selection is illustrated in FIG. 17 where a GUI 1700 includes a layout selection of layout 1702. The selected layout is then displayed as illustrated by GUI 1800 in FIG. 18. FIG. 18 includes the selected layout where first element 1602, second element 1604, and third element 1606 are displayed.

Figure 19:
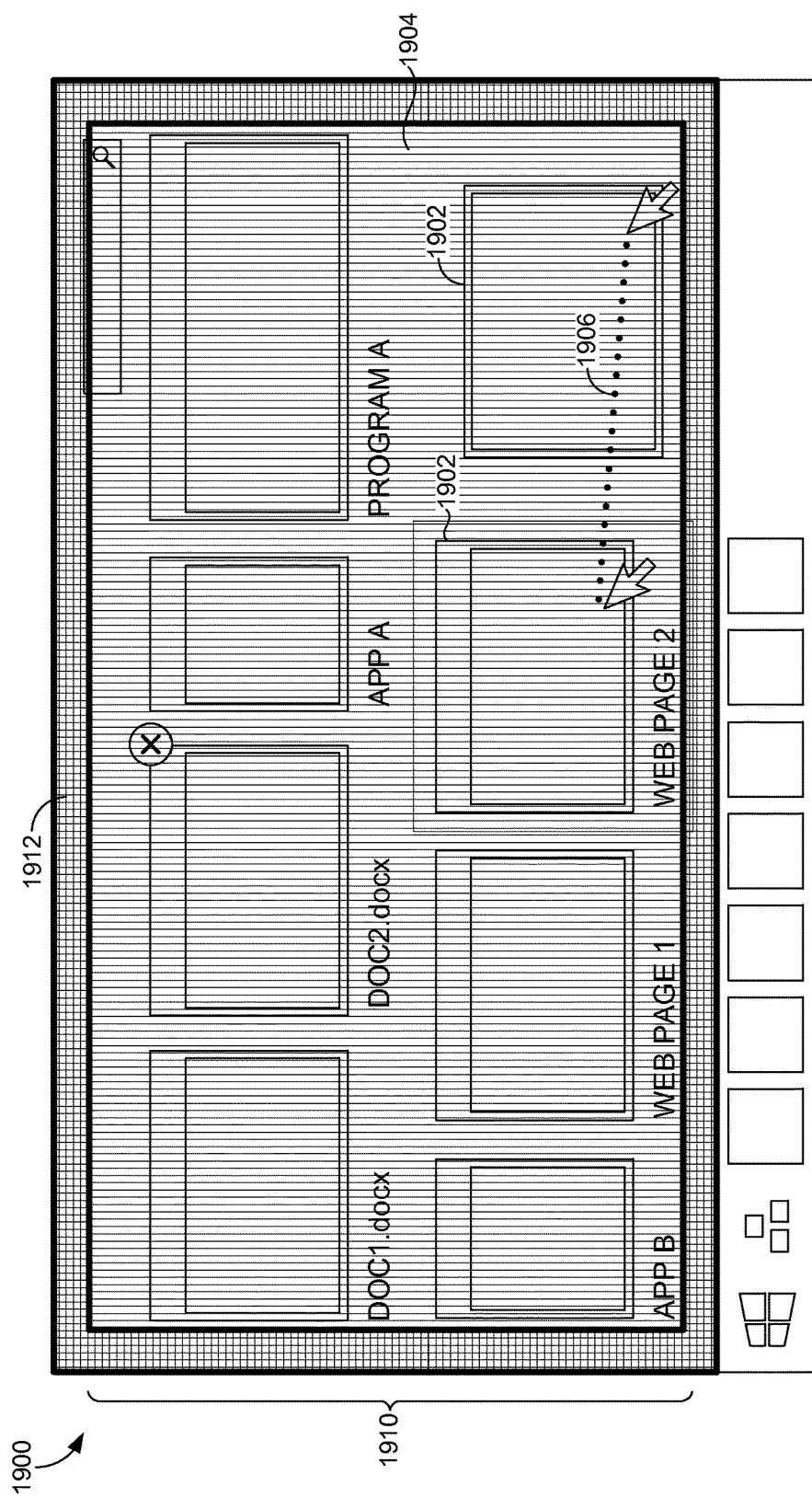
FIG. 19 is an exemplary graphical user interface for combined switching and window placement illustrating a snap portion of a display area.
Figure 20:
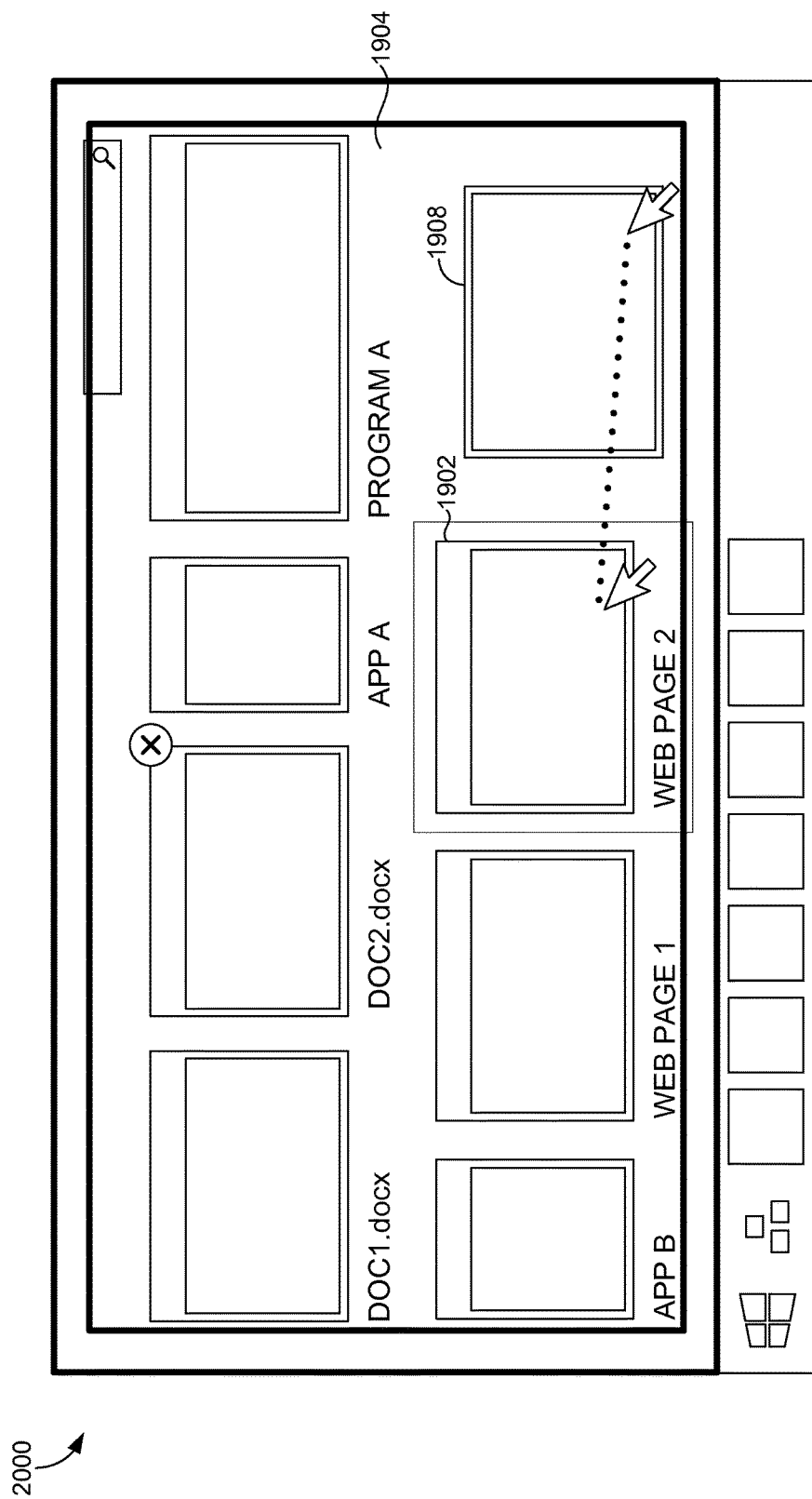
FIG. 20 is an exemplary graphical user interface for combined switching and window placement illustrating moving an element into a snap portion of a display area.

Turning now to FIG. 19, an illustrative GUI 1900 is provided illustrating a view of a snap portion 1912 of a display area 1910 and a non-snap portion 1904 of the display area 1910. As previously indicated, one or more elements, such as element 1902, may be selected for combined switching and placement by moving, via movement 1906, the element 1902 toward the snap portion 1912 of the display area 1910. While the element 1902 is still within the non-snap portion 1904 of the display area 1910, the element 1902 remains in the same state (e.g., not resized or repositioned as a target) as is indicated by element 1908 of GUI 2000 in FIG. 20. As long as elements remain within a non-snap portion of a display, they are simply moved within the non-snap portion. That is, the element is not "snapped" into a new position in the display area or automatically launched/opened as would be the case if the element were moved within the snap portion as illustrated by GUI 2100 in FIG. 21. In FIG. 21, the element 2102 has been moved into the snap portion 1912 and is launched, positioned, and opened as a result of the single action (i.e., moving the element into the snap position). The element may be launched automatically.

As is evident from the above, specific regions may be defined such that specific actions may be performed according to a region. A display area may include a non-switcher view (region), a switcher view, a hotspot, a snap portion, a non-snap portion, or the like. When elements are within regions that are not associated with the series of events (such as non-snap portions, etc.), a variety of actions may be performed on the elements such as simply moving the element, resizing the element itself, etc. When elements are within regions that are associated with the series of events, such as hotspots, snap portions, etc., the elements may undergo the series of events automatically upon entering the region or subsequent to entering the region (e.g., upon release of a user input device such as a mouse, upon a user removing an input device from a touch screen display, etc.).

In some embodiments, one or more of the illustrated components/modules may be implemented as stand-alone applications. In other embodiments, one or more of the illustrated components/modules may be implemented via the user computing device 2402, a remote server, or as an Internet-based service. It will be understood by those of ordinary skill in the art that the components/modules illustrated in FIG. 24 are exemplary in nature and in number and should not be construed as limiting. Any number of components/modules may be employed to achieve the desired functionality within the scope of embodiments hereof. Further, components/modules may be located on any number of computing devices. By way of example only, the computing device 2402 might be provided as a single computing device, a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

It should be noted that embodiments of the present invention are equally applicable to mobile computing devices and devices accepting gesture, touch and/or voice input. Any and all such variations, and any combination thereof, are contemplated to be within the scope of embodiments of the present invention.

Turning now to FIG. 22, a flow diagram is illustrated showing an exemplary method (2200) for combined switching and placement of windows. At block 2202, an indication that an element has been moved to a snap portion of a display area is received in a switcher view. At block 2204, in accordance with the indication that the element has been moved to the snap portion, the element is opened and a view is switched to a view of the element.

Turning now to FIG. 23, a flow diagram is illustrated showing an exemplary method (2300) for combined switching and placement of windows. At block 2302, an indication to switch to a switcher view is received in a non-switcher view. At block 2304, an indication that an element has been moved to a snap portion of a display area is received in a switcher view. At block 2306, upon receiving the indication that the element has been moved to the snap portion, the element is positioned in a predetermined location, opened, and a view is switched to a view of the element, wherein the view of the element includes the element in the predetermined location and one or more first windows that were previously open in the non-switcher view.

It will be understood by those of ordinary skill in the art that the order of steps shown in the methods 2200 and 2300 of FIGS. 22 and 23 is not meant to limit the scope of the present invention in any way and, in fact, the steps may occur in a variety of different sequences within embodiments hereof. Any and all such variations, and any combination thereof, are contemplated to be within the scope of embodiments of the present invention.

To recapitulate, an embodiment of the invention is directed to combined switching and placement of windows based on a single action. The single action may be moving an element desired to be open to a hot spot or a snap portion of a display area. Accordingly, one embodiment of the present invention is directed to one or more computer storage media storing computer-useable instructions that, when used by one or more computing devices, cause the one or more computing devices to perform a method for combined switching and placement of windows The claim recites in a switcher view, receiving an indication that an element has been moved to a snap portion of a display area, wherein the switcher view comprises a collection of elements; and in accordance with the indication that the element has been moved to the snap portion, opening the element and switching to a view of the element.

In another embodiment, the present invention is directed to a method being performed by one or more computing devices including at least one processor. The method includes in a non-switcher view, receiving an indication to switch to a switcher view, wherein the non-switcher view comprises one or more first windows, wherein the one or more first windows are windows that are currently open; in the switcher view, receiving an indication that an element has been moved to a snap portion of a display area, wherein the switcher view comprises a collection of elements; and upon receiving the indication that the element has been moved to the snap portion, positioning the element in a predetermined location, opening the element, and switching to a view of the element, wherein the view of the element comprises the element in the predetermined position and the one or more first windows.

In yet another embodiment, the present invention is directed to one or more computer storage media having computer-executable instructions embodied thereon that, when executed by a computing device, cause the computing device to generate a graphical user interface (GUI). The GUI comprises a switcher view of a display area configured to display a collection of elements; and a snap portion of the display area configured to identify when an element is within the snap portion such that an automatic initiation of a launch and position action is executed, wherein the snap portion of the display is activated in the switcher view.

Although the subject matter has been described in a language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. One or more computer storage media storing computer-useable instructions that, when used by one or more computing devices, cause the one or more computing devices to perform a method, the method comprising:
   providing a graphical user interface (GUI) comprising one or more snap portions and a collection of elements, wherein the collection of elements includes folders, wherein the folders include files;
   providing one or more open elements in a first layout corresponding to a first view; and
   receiving, in the first layout, a single step from a user to switch to a switcher view, which causes in the switcher view, the single step of a movement of an element to one of the one or more snap portions of a display area of the GUI to cause the files to be opened with their associated applications by a launching component and providing the opened files in a second layout specified by a positioning component.

2. The one or more computer-readable storage media of claim 1, wherein the movement of the element is a drag movement.

3. The one or more computer-readable storage media of claim 1, wherein the switcher view is a full screen view.

4. The one or more computer-readable storage media of claim 1, wherein the switcher view is a partial screen view.

5. The one or more computer-readable storage media of claim 1, wherein the collection of elements further comprises applications, windows, or a combination thereof.

6. The one or more computer-readable storage media of claim 1, wherein the one or more snap portions of the display area is a portion of the display area.

7. The one or more computer-readable storage media of claim 1, wherein the one or more snap portions of the display area is a corner of the display area.

8. The one or more computer-readable storage media of claim 1, further comprises a view of the element, wherein the view comprises the element and one or more windows.

9. The one or more computer-readable storage media of claim 8, wherein the one or more windows comprises one or more windows previously open in a non-switcher view.

10. A method being performed by one or more computing devices including at least one processor, the method comprising:
   providing a graphical user interface (GUI) comprising one or more snap portions and a collection of elements, wherein the collection of elements includes folders, wherein the folders include files;
   providing one or more open elements in a first layout corresponding to a first view; and
   receiving, in the first layout, a single step from a user to switch to a switcher view, which causes in the switcher view, the single step of a movement of an element to one of the one or more snap portions of a display area of the GUI to cause the files to be opened with their associated applications by a launching component and providing the opened files in a second layout specified by a positioning component.

11. The method of claim 10, wherein the switcher view is a partial screen view.

12. The method of claim 10, wherein the one or more snap portions of the display area includes at least a portion of the display area.

13. The method of claim 10, wherein the collection of elements further comprises files, folders, applications, windows, or a combination thereof.

* * * * *